US012640784B1

(12) United States Patent
Zhu et al.

(10) Patent No.: US 12,640,784 B1
(45) Date of Patent: May 26, 2026

(54) METHODS FOR SCHEDULING INTEGRATED SENSING AND COMMUNICATION BEAMS FOR MULTI-BASE STATION 5G AERONAUTICAL MOBILE AIRPORT COMMUNICATIONS SYSTEMS AND SYSTEMS FOR PERFORMING METHODS

(71) Applicant: BEIHANG UNIVERSITY, Beijing (CN)

(72) Inventors: Yanbo Zhu, Beijing (CN); Kaiquan Cai, Beijing (CN); Zhibo Zhang, Beijing (CN); Hongshuo Lyu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 19/336,446

(22) Filed: Sep. 22, 2025

(30) Foreign Application Priority Data

Aug. 20, 2025 (CN) .......................... 202511168542.4

(51) Int. Cl.
*H04B 7/0456* (2017.01)
*G08G 1/09* (2006.01)
*H04W 64/00* (2009.01)
*H04B 1/40* (2015.01)

(52) U.S. Cl.
CPC ........... *H04B 7/0456* (2013.01); *G08G 1/091* (2013.01); *H04W 64/006* (2013.01); *H04B 1/40* (2013.01)

(58) Field of Classification Search
CPC ..................................................... H04B 7/0456
USPC ......................................................... 375/262
See application file for complete search history.

(56) References Cited

U.S. PATENT DOCUMENTS

| | | | | |
|---|---|---|---|---|
| 2017/0254896 A1* | 9/2017 | Yamamoto | .............. | G01S 7/354 |
| 2021/0151043 A1* | 5/2021 | Lee | .......................... | G10L 15/22 |
| 2023/0376342 A1* | 11/2023 | Hashimoto | ............. | G06F 9/544 |

FOREIGN PATENT DOCUMENTS

| | | |
|---|---|---|
| CN | 114173417 A | 3/2022 |
| CN | 116113050 A | 5/2023 |

* cited by examiner

*Primary Examiner* — Lihong Yu
(74) *Attorney, Agent, or Firm* — PORUS IP LLC

(57) ABSTRACT

A method for scheduling integrated sensing and communication beams for a multi-base station 5G AeroMACS and a system for performing the method are provided. The method includes providing cooperative vehicles at an airport surface, equipping each of the cooperative vehicles with a 5G AeroMACS transceiver array antenna, a satellite positioning system, and a speed sensing system, and using non-cooperative vehicles as sensing targets; establishing a 5G AeroMACS integrated sensing and communication network for the airport surface; establishing a measurement model; constructing a trajectory evolution model; obtaining targets assigned to a plurality of cooperative vehicles at the current frame moment; constructing a channel model of communication and a channel model of sensing; and for each pair of the cooperative vehicles and the targets obtained by matching, designing a joint transmit-receive radiation pattern of a MIMO array; realizing signal transmitting and receiving beamforming of the cooperative vehicles.

14 Claims, 9 Drawing Sheets

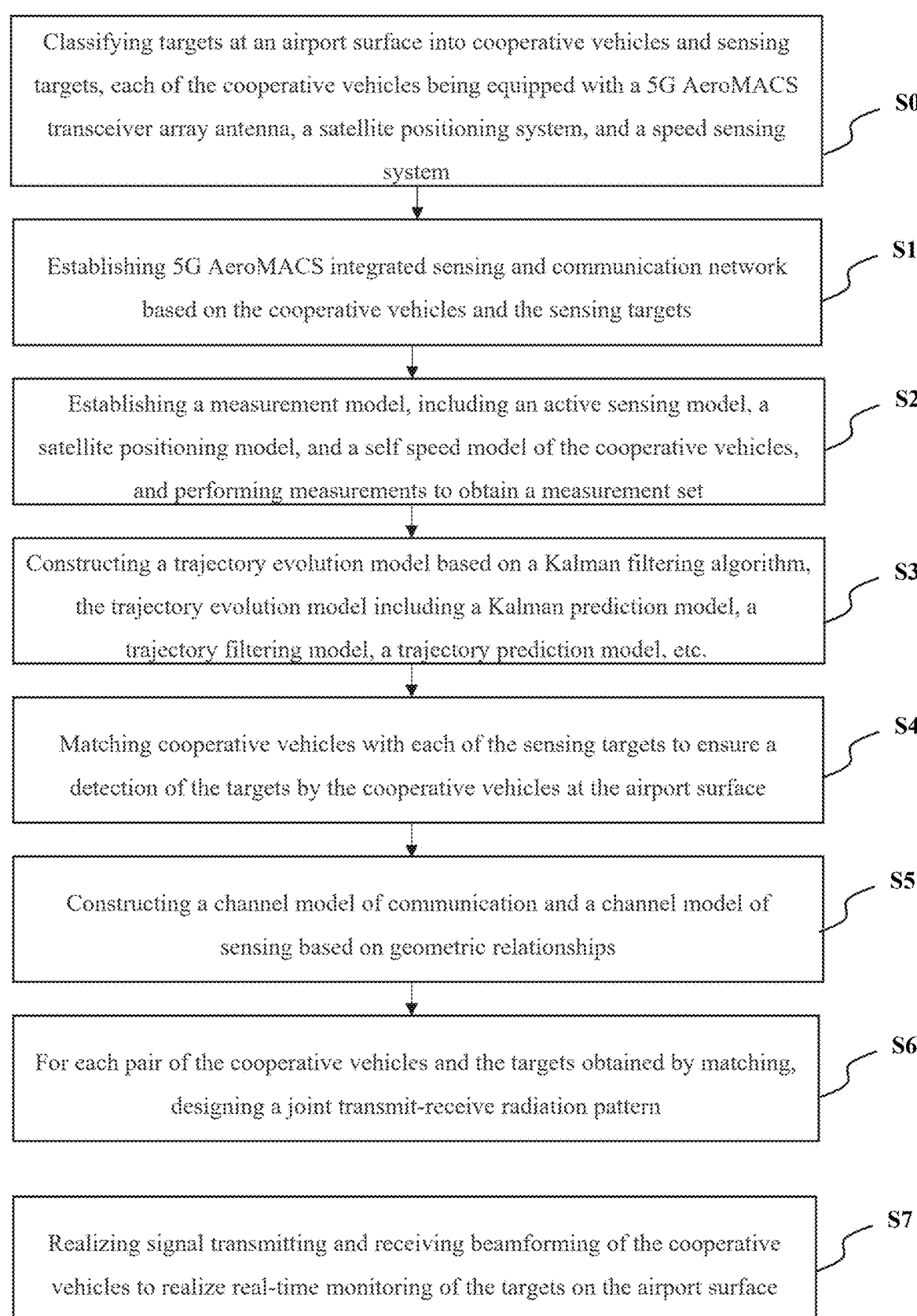

Classifying targets at an airport surface into cooperative vehicles and sensing targets, each of the cooperative vehicles being equipped with a 5G AeroMACS transceiver array antenna, a satellite positioning system, and a speed sensing system — S0

Establishing 5G AeroMACS integrated sensing and communication network based on the cooperative vehicles and the sensing targets — S1

Establishing a measurement model, including an active sensing model, a satellite positioning model, and a self speed model of the cooperative vehicles, and performing measurements to obtain a measurement set — S2

Constructing a trajectory evolution model based on a Kalman filtering algorithm, the trajectory evolution model including a Kalman prediction model, a trajectory filtering model, a trajectory prediction model, etc. — S3

Matching cooperative vehicles with each of the sensing targets to ensure a detection of the targets by the cooperative vehicles at the airport surface — S4

Constructing a channel model of communication and a channel model of sensing based on geometric relationships — S5

For each pair of the cooperative vehicles and the targets obtained by matching, designing a joint transmit-receive radiation pattern — S6

Realizing signal transmitting and receiving beamforming of the cooperative vehicles to realize real-time monitoring of the targets on the airport surface — S7

FIG. 2

METHODS FOR SCHEDULING INTEGRATED SENSING AND COMMUNICATION BEAMS FOR MULTI-BASE STATION 5G AERONAUTICAL MOBILE AIRPORT COMMUNICATIONS SYSTEMS AND SYSTEMS FOR PERFORMING METHODS

CROSS-REFERENCE TO RELATED APPLICATIONS

This application claims priority to Chinese Patent Application No. 202511168542.4, filed on Aug. 20, 2025, the entire contents of which are hereby incorporated by reference.

TECHNICAL FIELD

The disclosure relates to the field of airport surface monitoring technology, and in particular, to a method for scheduling integrated sensing and communication beams for a multi-base station 5G aeronautical mobile airport communications system and a system for performing the method.

BACKGROUND

Against the backdrop of rapid development in the aviation industry, the continuous expansion of airport operations and the increasing density of flights have made the management of vehicles on an airport surface increasingly important. Traditional monitoring systems, while capable of providing basic monitoring data, are deficient in real-time data, a processing speed, and monitoring accuracy, which limits the operational efficiency and safety of the airport surface. Especially in the management of vehicles on the airport surface, achieving precise positioning, tracking, and identification of the vehicles has become the key to improving the efficiency of the airport operation and ensuring safety.

Chinese Patent Application No. CN116113050A, titled "Method and device for dynamically scheduling beams", discloses a method for scheduling beams, which uses a satellite communication system to execute a beam scheduling command. However, the method does not solve the problem of monitoring moving targets on the airport surface.

Chinese Patent Application No. CN114173417A, titled "Method for scheduling satellite beams", discloses a method for scheduling the satellite beams. The method also does not solve the problem of monitoring the moving targets on the airport surface.

Therefore, it is necessary to provide a method for scheduling integrated sensing and communication beams for a multi-base station 5G aeronautical mobile airport communications system (AeroMACS) and a system for performing the method, which may utilize characteristics such as high bandwidth and low latency provided by 5G communication technology to realize the real-time and accurate monitoring of the vehicles and airplanes on the airport surface.

SUMMARY

Some embodiments of the present disclosure provide a method for scheduling integrated sensing and communication beams for a multi-base station 5G AeroMACS. The method may include providing cooperative vehicles at an airport surface, equipping each of the cooperative vehicles with a 5G AeroMACS transceiver array antenna, a satellite positioning system, and a speed sensing system, and using non-cooperative vehicles as sensing targets; establishing a 5G AeroMACS integrated sensing and communication network for the airport surface based on the cooperative vehicles and the sensing targets, targets including the cooperative vehicles and the sensing targets; establishing a measurement model, including establishing an active sensing model, a satellite positioning model of the cooperative vehicles, and a self speed model of the cooperative vehicles, performing measurements, and obtaining a measurement set at a current frame moment; constructing a trajectory evolution model based on a Kalman filtering algorithm to portray motion states of the cooperative vehicles and the sensing targets in a real coordinate system; matching the cooperative vehicles with a plurality of targets to obtain targets assigned to a plurality of cooperative vehicles at the current frame moment; constructing a channel model of communication and a channel model of sensing based on geometric relationships in an airport surface networking scenario; for each pair of the cooperative vehicles and the targets obtained by matching, designing a joint transmit-receive radiation pattern of a multiple-input multiple-output (MIMO) array and solving the joint transmit-receive radiation pattern to obtain a transmit precoding matrix of a communication data stream, a transmit precoding matrix of an auxiliary sensing data stream, a communication receive weighting vector, and a value of a sensing receive weighting vector; realizing signal transmitting and receiving beamforming of the cooperative vehicles to realize real-time monitoring of the targets on the airport surface by means of the transmit precoding matrix of the communication data stream, the transmit precoding matrix of the auxiliary sensing data stream, the communication receive weighting vector, and the value of the sensing receive weighting vector; and confirming whether a stop command is received, in response to determining that the stop command is received, terminating the program; in response to determining that the stop command is not received, re-establishing the measurement model for measurement and obtaining the measurement set at the current frame moment, and receiving reflected echoes of the targets based on the signal transmitting and receiving beamforming of the cooperative vehicles, obtaining a measurement result, and substituting the measurement result to execute a next round of sensing matching, including generating beamforming parameters based on the transmit precoding matrix of the communication data stream, the transmit precoding matrix of the auxiliary sensing data stream, the communication receive weighting vector, and the value of the sensing receive weighting vector, and driving, based on the beamforming parameters, the transceiver array antenna of the cooperative vehicle to operate via a controller.

In some embodiments, the real-time monitoring may include generating, based on real-time monitoring results of the targets, a dispatch instruction to control the cooperative vehicles to drive away from an alert region; and/or generating an alert instruction to control broadcasting devices in the alert region where the targets are present to broadcast a pre-existing voice for evacuation. The alert region may include a plurality of runways where aircraft are to take off or land.

In some embodiments, the satellite positioning system may be configured to obtain absolute position information of the cooperative vehicles, and the speed sensing system includes a speedometer integrated in a control system of the cooperative vehicles.

In some embodiments, the process of establishing a 5G AeroMACS integrated sensing and communication network for the airport surface based on the cooperative vehicles and the sensing targets may include setting a count of the cooperative vehicles to be N, a count of the sensing targets to be M. A true state vector of the targets at a moment of a current frame t of a current round is:

$$\bar{v}_{l,t} = \left[\bar{x}_{l,t}, \bar{y}_{l,t}, \bar{v}_{x,l,t}, \bar{v}_{y,l,t}\right]^T, l = 1, 2, \ldots N, \ldots, N+M$$

l denotes an index of a target, $\bar{x}_{l,t}$ denotes a horizontal position of a target l, $\bar{y}_{l,t}$ denotes an vertical position of the target l, $\bar{v}_{x,l,t}$ denotes a horizontal speed of the target l, $\bar{v}_{y,l,t}$ denotes a vertical speed of the target l, $(\bar{x}_{l,t}, \bar{y}_{l,t})$ is designated as a true position of the target l, and $(\bar{v}_{x,l,t}, \bar{v}_{y,l,t})$ is designated as a true speed of the target l.

In some embodiments, the process of establishing a measurement model including, establishing an active sensing model, a satellite positioning model of the cooperative vehicles, and a self speed model of the cooperative vehicles, performing measurements, and obtaining a measurement set at a current frame moment, may include constructing the active sensing model; constructing the satellite positioning model of the cooperative vehicles based on the satellite positioning system configured on the cooperative vehicles; constructing the self speed model of the cooperative vehicles based on the speed sensing system configured on the cooperative vehicles; performing corresponding signal processing and target parameter estimation based on target reflected echoes of sensing beams emitted in a previous iteration to obtain measured values of positions and measured values of speeds of the sensing targets at the current frame moment of a current round, where for a first iteration, the measured values of positions and the measured values of speeds of the sensing targets are measured values of preset positions and measured values of speeds of the sensing targets; obtaining the measurement result through the active sensing model, the satellite positioning model of the cooperative vehicles, and the self speed model of the cooperative vehicles, and obtaining the measurement set at the current frame moment, where the measurement set includes the current frame moment, measured values of relative distances between the cooperative vehicles and the targets, measured values of relative speeds between the cooperative vehicles and the targets, and measured values of relative angles between the cooperative vehicles and the targets, and measurement results of the target, the measurement results of the targets are measured values of positions and measured values of speeds of the targets, including measured values of positions and measured values of speeds of the cooperative vehicles, and measured values of positions and measured values of speeds of the sensing targets.

In some embodiments, the trajectory evolution model may include a Kalman prediction model, a trajectory filtering model, and a trajectory prediction model.

In some embodiments, the process of constructing a trajectory evolution model based on a Kalman filtering algorithm to portray motion states of the cooperative vehicles and the sensing targets in a real coordinate system may include for all targets, constructing the Kalman prediction model based on trajectory state predictions and trajectory prediction covariance arrays of the targets of previous two rounds and obtaining trajectory state one-step predictions and trajectory one-step prediction covariance arrays of the targets; constructing the trajectory filtering model based on a measurement correlation result of a minimum Mahalanobis distance through a trajectory updating process, and obtaining trajectory state estimates of the targets and trajectory filtering covariance arrays; constructing the trajectory prediction model based on the trajectory state estimates of the targets and the trajectory filtering covariance arrays and obtaining the trajectory state predictions and the trajectory prediction covariance arrays of the targets for the current round; and judging a detection of the all targets, comparing a count of consecutive undetected frames of a plurality of targets with a preset exit frame threshold, and determining a target for which the count of consecutive undetected frames is greater than or equal to the preset exit frame threshold as a target extinction, where the target exits a trajectory filtering loop; and for a target for which the count of consecutive undetected frames is less than the preset exit frame threshold, saving the trajectory state predictions and the trajectory prediction covariance arrays obtained for the current round as a trajectory filtering result and a trajectory prediction result of the target.

In some embodiments, the process of comparing a count of consecutive undetected frames of a plurality of targets with a preset exit frame threshold may include comparing the count of consecutive undetected frames of the plurality of targets with a plurality of preset exit frame thresholds corresponding to the plurality of targets, where the plurality of preset exit frame thresholds corresponding to the plurality of targets are determined at a first time point corresponding to the plurality of targets, the first time point corresponding to the plurality of targets refers to a time point nearest to a current time point at which the plurality of targets are detected; and determining the plurality of preset exit frame thresholds corresponding to the plurality of the targets includes determining predictive confidence levels of the plurality of targets based on positions of the plurality of targets and an environmental complexity value of an airport, where the environmental complexity value is determined based on an environmental characteristic; and determining the plurality of preset exit frame thresholds corresponding to the plurality of targets based on the predictive confidence levels of the plurality of targets, motion data of the plurality of targets, and the environmental characteristics.

In some embodiments, the process of determining the plurality of preset exit frame thresholds corresponding to the plurality of the targets based on the predictive confidence levels of the plurality of targets, motion data of the plurality of targets, and the environmental characteristics may further include determining, based on the predictive confidence levels, the motion data, the environmental characteristics, and perceptual importance values of the plurality of targets, the plurality of preset exit frame thresholds corresponding to the plurality of targets. The perceptual importance values of the plurality of targets may be related to the positions of the plurality of targets.

In some embodiments, the process of matching the cooperative vehicles with a plurality of targets to obtain targets assigned to a plurality of cooperative vehicles at the current frame moment may include sampling, based on the trajectory state predictions and the trajectory prediction covariance arrays of the targets, trajectory state estimates of a plurality of the cooperative vehicles and a plurality of sensing targets, respectively, sampling a set count of sigma points, and obtaining state vectors and positions of a plurality of sampled sigma points; obtaining, based on positions of sigma points of the plurality of cooperative vehicles and positions of sigma points of the plurality of sensing targets, filtering distances and filtering angles of the sigma points of the plurality of cooperative vehicles and the sigma points of the targets; determining a Cramér-Rao lower bound of a pair of the sigma points of the cooperative vehicles and the sigma points of the targets, and obtaining a weighted objective function $B_{i,l,t}$ of the targets with respect to the plurality of cooperative vehicles, where 1 denotes the index of the targets and i denotes the index of the plurality of cooperative vehicles; constructing a sensing target matching optimization problem by using a 0-1 integer programming problem model to achieve sensing of all targets, and defining optimization variables as a matching matrix, where when a matching item $A_{i,l,t}=1$ in a matching matrix, a cooperative vehicle i forms a beam pointing toward a target 1, and the matching item $A_{i,l,t}=0$ represents no beam pointing; establishing an objective function, by minimizing a total sensing cost and using a constraint to ensure that the plurality of targets are sensing by the plurality of cooperative vehicles, where the objective function is:

$$\min \sum_{i,l} A_{i,l,t} \cdot B_{i,l,t}$$

$$\text{s.t.} \sum_{i} A_{i,l,t} \geq 1.$$

$$A_{i,l,t} \in \{0, 1\}$$

The targets assigned to the plurality of cooperative vehicles at the current frame moment of the current round may be obtained by solving the objective function.

In some embodiments, the set count of sigma points corresponding to the plurality of sensing targets may be different. The process of determining the set count of sigma points of the plurality of sensing targets may include determining the set count of sigma points of the plurality of targets based on predictive confidence levels of the plurality of the targets.

In some embodiments, the process of determining the set count of sigma points of the plurality of targets based on predictive confidence levels of the plurality of the targets may further include determining the set count of sigma points of the plurality of targets based on the predictive confidence levels and motion data of the plurality of targets.

In some embodiments, the process of determining the set count of sigma points of the plurality of targets based on predictive confidence levels of the plurality of targets may further include determining the set count of sigma points of the plurality of targets based on the predictive confidence levels and airport operation data. The airport operation data may include aircraft movements taking off or landing at the airport and passenger throughput during a preset time period.

In some embodiments, the process of constructing a channel model of communication and a channel model of sensing based on geometric relationships in an airport surface networking scenario may include obtaining position error prediction covariance arrays of the targets based on the trajectory prediction covariance arrays of the targets; obtaining an upper bound of a communication channel uncertainty; obtaining an upper bound of a sensing channel uncertainty; and constructing the channel model of communication and the channel model of sensing, respectively, to obtain a channel matrix of communication and a channel matrix of sensing.

In some embodiments, the for each pair of the cooperative vehicles and the targets obtained by matching, designing a joint transmit-receive radiation pattern of a multiple-input multiple-output (MIMO) array and solving the joint transmit-receive radiation pattern to obtain a transmit precoding matrix of a communication data stream, a transmit precoding matrix of an auxiliary sensing data stream, a communication receive weighting vector, and a value of a sensing receive weighting vector may include for each pair of a cooperative vehicle i and a target l, designing the joint transmit-receive radiation pattern of the MIMO array, and obtaining a transmit signal waveform after the transmit precoding matrix as:

$$x_{i,l,t} = W_{s,i,l,t} s_{s,i,l,t} + W_{c,i,l,t} s_{c,i,l,t}$$

In the equation, $W_{s,i,l,t}$ denotes the transmit precoding matrix of the auxiliary sensing data stream, $s_{s,i,l,t}$ denotes the auxiliary sensing data stream, $W_{c,i,l,t}$ denotes the transmit precoding matrix of the communication data stream, and $s_{c,i,l,t}$ denotes the communication data stream, and the auxiliary sensing data stream $s_{s,i,l,t}$ and the communication data stream $s_{c,i,l,t}$ are preset values.

The transmit signal waveform may satisfy:

$$\|x_{i,l,t}\|^2 \leq p_0.$$

In the equation, $p_0$ denotes a maximum total transmit power of array antennas, the maximum total transmit power of the array antennas is determined by setting the 5G AeroMACS transceiver array antenna assembled in the cooperative vehicles. The signal-to-interference-plus-noise ratio for communication and a signal-to-interference-plus-noise ratio of communication and a signal-to-noise ratio of sensing may be constructed, respectively:

$$\gamma_{c,i,l,t} = \frac{\left|w_{r,c,i,l,t}^H H_{c,i,l,t} W_{c,i,l,t} s_{c,i,l,t}\right|^2}{\left|w_{r,c,i,l,t}^H H_{c,i,l,t} W_{s,i,l,t} s_{s,i,l,t}\right|^2 + \left|w_{r,c,i,l,t}^H n_{c,i,l,t}\right|^2}$$

$$\gamma_{s,i,l,t} = \frac{\left|w_{c,s,i,l,t}^H H_{s,i,l,t} x_{i,l,t}\right|^2}{\left|w_{c,s,i,l,t}^H n_{s,i,l,t}\right|^2}$$

In the equations, $\gamma_{c,i,l,t}$ denotes the signal-to-interference-plus-noise ratio of communication, $\gamma_{s,i,l,t}$ denotes the signal-to-noise ratio of sensing, $$w_{r,c,i,l,t}^H$$

denotes a complex conjugate transpose of the communication receive weighting vector, $$w_{c,s,i,l,t}^H$$

denotes a complex conjugate transpose of the sensing receive weighting vector, $n_{c,i,l,t}$ denotes a communication reception noise, $n_{s,i,l,t}$ denotes a sensing reception noise, $H_{c,i,l,t}$ denotes the channel matrix of communication, and $H_{s,i,l,t}$ denotes the channel matrix of sensing. A joint transmit-receive radiation pattern of communication and sensing may be constructed as a following optimization problem:

$$\max \lambda \gamma_{c,i,l,t} + (1 - \lambda) \gamma_{s,i,l,t}$$

$$\text{s.t.} \|x_{i,l,t}\|^2 \leq p_0$$

In the equations, $\lambda$ denotes a weighting factor and $0 \leq \lambda \leq 1$.

The optimization problem may be solved to obtain the transmit precoding matrix of the communication data stream, the transmit precoding matrix of the auxiliary sensing data stream, the communication receive weighting vector, and the value of the sensing receive weighting vector.

One or more embodiments of the present disclosure provide a system for performing the method for scheduling integrated sensing and communication beams for a multi-base station 5G AeroMACS. The system may include the cooperative vehicles configured in the airport surface, where each of the cooperative vehicles may be configured with the 5G AeroMACS transceiver array antenna, the satellite positioning system, and the speed sensing system, the satellite positioning system is configured to obtain absolute position information of the cooperative vehicles, and the speed sensing system may include a speedometer integrated in a control system of the cooperative vehicles; and the sensing targets including the non-cooperative vehicles and aircrafts at the airport surface, where the cooperative vehicles and the sensing targets form the 5G AeroMACS integrated sensing and communication network for the airport surface, and each of the cooperative vehicles is configured with a measure module, a trajectory evolution module, and a target matching module of an approximate posterior distribution.

BRIEF DESCRIPTION OF THE DRAWINGS

In order to more clearly illustrate the embodiments of the present disclosure or the present technical solutions, the following will briefly introduce the accompanying drawings that need to be used in the embodiments. By referring to the accompanying drawings, one may more clearly understand the features and advantages of the present disclosure, the accompanying drawings are schematic and should not be construed as any limitation of the present disclosure, and other drawings may be obtained from these drawings by persons of ordinary skill in the art without the expenditure of creative labor.

FIG. 2 is a flowchart illustrating an exemplary process of a method for scheduling integrated sensing and communication beams for a multi-base station 5G AeroMACS according to some embodiments of the present disclosure;

DETAILED DESCRIPTION

Figure 1:
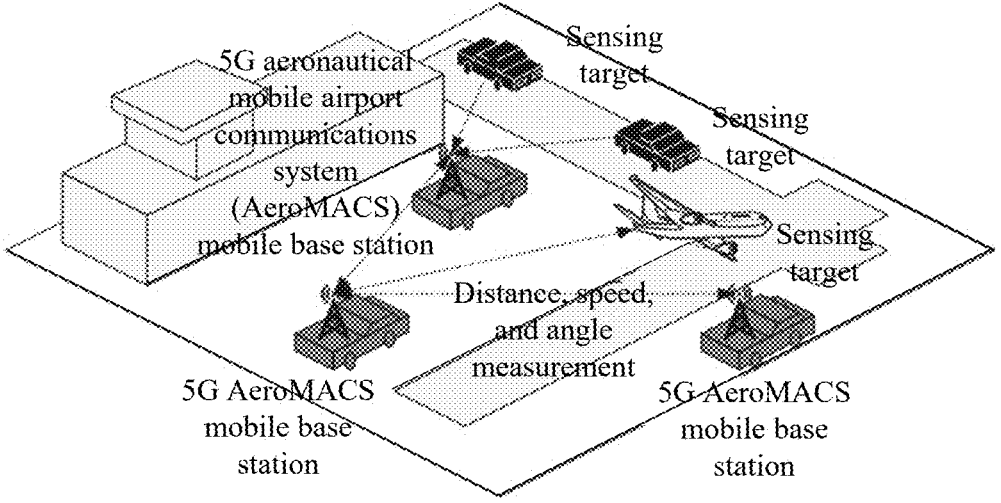
FIG. 1 is a schematic diagram illustrating a method for scheduling integrated sensing and communication beams for a multi-base station 5G AeroMACS according to some embodiments of the present disclosure.

In order to be able to more clearly understand the above purposes, features, and advantages of the present disclosure, the present disclosure is described in further detail below in conjunction with the accompanying drawings and specific embodiments. It should be noted that the embodiments and the features in the embodiments of the present disclosure may be combined with each other without conflict.

Specific details are set forth in the following description in order to facilitate a full understanding of the present disclosure. However, the present disclosure may be carried out in other ways than those described herein, and therefore, the scope of protection of the present disclosure is not limited by the following disclosed specific embodiments.

A method for scheduling integrated sensing and communication beams for a multi-base station 5G AeroMACS provided according to some embodiments of the present disclosure is described in detail below with reference to the accompanying drawings.

The symbol description is as follows.

N denotes a count of cooperative vehicles.

M denotes a count of sensing targets.

l denotes an index of a target and l=1,2, ... N, ... , N+M.

t denotes a frame number and represents a current frame of the current round.

$\bar{v}_{l,t}$ denotes a true state vector of a l-th target.

$\bar{x}_{l,t}$ denotes a horizontal position of the l-th target.

$\bar{y}_{l,t}$ denotes a vertical position of the l-th target.

$\bar{v}_{x,l,t}$ denotes a horizontal speed of the l-th target.

$\bar{v}_{y,l,t}$ denotes a vertical speed of the l-th target.

$\bar{R}_{i,l,t}$ denotes a measured value of a relative distance between the i-th cooperative vehicle and the l-th target.

$\bar{x}_{i,t}$ denotes a horizontal position of the i-th cooperative vehicle.

$\bar{x}_{j,t}$ denotes a horizontal position of the j-th sensing target.

$\bar{y}_{i,t}$ denotes a vertical position of the i-th cooperative vehicle.

$\bar{y}_{j,t}$ denotes a vertical position of the j-th sensing target.

$\bar{V}_{i,l,t}$ denotes a measured value of a relative speed of the i-th cooperative vehicle and the l-th target.

$\bar{v}_{x,i,t}$ denotes a horizontal speed of the i-th cooperative vehicle.

$\bar{v}_{x,j,t}$ denotes a horizontal speed of the j-th sensing target.

$\bar{v}_{y,i,t}$ denotes a vertical speed of the i-th cooperative vehicle.

$\bar{v}_{y,j,t}$ denotes a vertical speed of the j-th sensing target.

$\bar{A}_{i,l,t}$ denotes a measured value of a relative angle between the i-th cooperative vehicle and the l-th target.

i denotes an index of a cooperative vehicle and i=1, ... , N.

j denotes an index of a sensing target and $j=(N+1), \ldots, (N+M)$.

$n(\cdot)$ denotes a measured noise.

$\tilde{x}_{i,t}$ denotes a horizontal position of the i-th cooperative vehicle obtained by a satellite system.

$\tilde{y}_{i,t}$ denotes a vertical position of the i-th cooperative vehicle obtained by the satellite system.

$\tilde{V}_{i,t}$ denotes a display speed of a speedometer of the i-th cooperative vehicle.

F denotes a state transfer matrix.

$$\hat{v}_{T,t}^{-}$$

denotes a trajectory state prediction of the l-th target at a t-th frame.

$$\hat{P}_{T,t}^{-}$$

denotes a trajectory prediction covariance array of the l-th target at the t-th frame.

$$\hat{v}_{l,t}^{+}$$

denotes a trajectory state one-step prediction of the l-th target at the t-th frame.

$$\hat{P}_{l,t}^{+}$$

denotes a trajectory one-step prediction covariance array of the l-th target at the t-th frame.

I denotes a unit matrix.

$Q_l$ denotes a covariance array of a process noise.

$\delta t$ denotes a frame interval.

$K_{l,t}$ denotes a Kalman gain matrix.

$\hat{P}_{l,t}$ denotes a trajectory filtering covariance array of the l-th target at the t-th frame.

$\hat{v}_{l,t}$ denotes a trajectory state estimate of the l-th target at the t-th frame.

$\tilde{z}_{l,t}$ denotes a measurement result of the l-th target at the t-th frame.

$R_l$ denotes a covariance array of a measured noise of the l-th target.

$G_{l,t}$ denotes a Jacobi matrix of a measurement model with respect to the true state vector $\overline{v}_{l,t}$.

$k_i$ denotes an index of a sigma point sampled from the trajectory state estimate of the i-th cooperative vehicle, and $k_i=1,2, \ldots, L$.

$k_j$ denotes an index of a sigma point sampled from the trajectory state estimate of the j-th sensing target, and $k_j=1,2, \ldots, L$.

$\hat{x}_{i,k_i,t}$ denotes a horizontal position of the $k_i$-th sigma point of the i-th cooperative vehicle.

$v_{i,k_i,t}$ denotes a state vector of the $k_i$-th sigma point of the i-th cooperative vehicle.

$\hat{y}_{i,k_i,t}$ denotes a vertical position of the $k_i$-th sigma point of the i-th cooperative vehicle.

$\hat{x}_{j,k_j,t}$ denotes a horizontal position of a $k_j$-th sigma point of the j-th sensing target.

$v_{j,k_j,t}$ denotes a state vector of the $k_j$-th sigma point of the j-th sensing target.

$\hat{y}_{j,k_j,t}$ denotes a vertical position of the $k_j$-th sigma point of the j-th sensing target.

$v_{j,k_j,t}$ denotes a state vector of the $k_j$-th sigma point of the j-th sensing target.

$$\hat{v}_{i,t}^{-}$$

denotes a state vector of the i-th cooperative vehicle at the t-th frame.

$$\hat{P}_{i,t}^{-}$$

denotes a trajectory prediction covariance array of the i-th cooperative vehicle at the t-th frame.

$$\hat{v}_{j,t}^{-}$$

denotes a state vector of the j-th sensing target at the t-th frame.

$$\hat{P}_{j,t}^{-}$$

denotes a trajectory prediction covariance array of the j-th sensing target at the t-th frame.

$\alpha$ denotes a sampling count item of a sigma point, and $L=2\alpha+1$.

$\hat{x}_{l,k_l,t}$ denotes a horizontal position of a $k_l$-th sigma point of the l-th target at the t-th frame.

$\hat{y}_{l,k_l,t}$ denotes a vertical position of the $k_l$-th sigma point of the l-th target at the t-th frame.

$k_l$ denotes an index of a sigma point sampled from the trajectory state estimate of the l-th target, and $k_l=1,2, \ldots, L$.

$\hat{R}_{i,l,k_i,k_l,t}$ denotes a filtering distance between the $k_i$-th sigma point of the i-th cooperative vehicle and the $k_l$-th sigma point of the l-th target.

$\hat{A}_{i,l,k_i,k_l,t}$ denotes a filtering angle between the $k_i$-th sigma point of the i-th cooperative vehicle and the $k_l$-th sigma point of the l-th target.

$CRB_{R,k_i,k_l,t}$ denotes a Cramér-Rao lower bound of a distance between the $k_i$-th sigma point and $k_l$-th sigma point.

$CRB_{V,k_i,k_l,t}$ denotes a Cramér-Rao lower bound of a radial speed of the $k_i$-th sigma point and $k_l$-th sigma point.

$CRB_{A,k_i,k_l,t}$ denotes a Cramér-Rao lower bound of an angle between the $k_i$-th sigma point and $k_l$-th sigma point.

$CRB_{R,t}$ denotes a Cramér-Rao lower bound of the distance.

$CRB_{V,t}$ denotes a Cramér-Rao lower bound of the radial speed.

$CRB_{A,t}$ denotes a Cramér-Rao lower bound of the angle.

$c_R$ denotes a distance perception factor defined by a signal waveform.

$c_V$ denotes a speed perception factor defined by the signal waveform.

$c_A$ denotes an angle perception factor defined by the signal waveform.

$p_T$ denotes a transmit power.

$B_{(N)\times(N+M)}$ denotes a perceived cost matrix.

$B_{i,l,t}$ denotes a weighted objective function of the l-th target with respect to the i-th cooperative vehicle.

$c_1$ denotes a weighting factor of the distance.

$c_2$ denotes a weighting factor of the radial speed.

$c_3$ denotes a weighting factor of the angle.

$A_{(N)\times(N+M)}$ denotes a matching matrix.

$A_{i,l,t}$ denotes a matching item in the matching matrix.

$x_{i,l,t}$ denotes a transmit signal waveform.

$s_{c,i,l,t}$ denotes a communication data stream.

$s_{s,i,l,t}$ denotes an auxiliary sensing data stream.

$W_{c,i,l,t}$ denotes a transmit precoding matrix of the communication data stream.

$W_{s,i,l,t}$ denotes a transmit precoding matrix of the auxiliary sensing data stream.

$p_0$ denotes a maximum total transmit power of array antennas.

$H_{c,i,l,t}$ denotes a channel matrix of communication.

$H_{s,i,l,t}$ denotes a channel matrix of sensing.

$\overline{H}_{c,i,l,t}$ denotes a mean value of the channel matrix of communication.

$\overline{H}_{s,i,l,t}$ denotes a mean value of the channel matrix of sensing.

$\delta_{H_{c,t}}$ denotes an error of the channel matrix of communication.

$\delta_{H_{s,t}}$ denotes an error of the channel matrix of sensing.

$\Omega_c$ denotes a weighting parameter matrix of an upper bound of a communication channel uncertainty.

$\Omega_s$ denotes a weighting parameter matrix of an upper bound of a sensing channel uncertainty.

$f_c(\{\hat{P}_{i,l,t}\})$ denotes an upper bound of the communication channel uncertainty.

$f_s(\{\hat{P}_{i,l,t}\})$ denotes an upper bound of the sensing channel uncertainty.

$\hat{P}_{i,l,t}$ denotes a position error prediction covariance array of the l-th target.

$$w_{r,c,i,l,t}^H$$

denotes a complex conjugate transpose of a communication receive weighting vector.

$$w_{c,s,i,l,t}^H$$

denotes a complex conjugate transpose of a sensing receive weighting vector.

$\gamma_{c,i,l,t}$ denotes a signal-to-interference-plus-noise ratio of communication.

$\gamma_{s,i,l,t}$ denotes a signal-to-noise ratio of sensing.

$n_{c,i,l,t}$ denotes a communication reception noise.

$n_{s,i,l,t}$ denotes a sensing reception noise.

$\lambda$ denotes a weighting factor, and $0\leq\lambda\leq1$.

Some embodiments of the present disclosure provide a method for scheduling integrated sensing and communication beams for a multi-base station 5G AeroMACS (hereinafter referred to as the method). The method is performed by a system for scheduling integrated sensing and communication beams for a multi-base station 5G AeroMACS (hereinafter referred to as the system).

FIG. 1 is a schematic diagram illustrating a method for scheduling integrated sensing and communication beams for a multi-base station 5G AeroMACS according to some embodiments of the present disclosure.

In some embodiments, as shown in FIG. 1, a network constructed according to the method of the present disclosure includes providing a plurality of 5G AeroMACS mobile base stations configured with 5G AeroMACS transceiver array antennas at an airport surface. In the embodiments, a technician configures each of cooperative vehicles with a 5G AeroMACS transceiver array antenna and a satellite positioning system, designates the cooperative vehicle as a 5G AeroMACS mobile base station, designates non-cooperative vehicles, aircraft, etc., such as sensing targets, and designates the cooperative vehicles and the sensing targets as targets.

In a communication network constructed by the method of the embodiments, integrated sensing and communication beams directing toward the cooperative vehicles and the sensing targets are formed using an advanced waveform design technique, which realizes efficient sensing of the cooperative vehicles and the sensing targets in the airport surface. Each of the cooperative vehicles may transmit and receive the integrated sensing and communication beams, which realizes localization, identification, and tracking of the targets through precise signal processing. The targets may include the cooperative vehicles and the sensing targets. The design of the communication network takes into account the complex environment and dynamic changes of the airport surface, improving the robustness and reliability of the system through optimized signal transmission and processing strategies. In addition, the communication network with a good scalability may flexibly increase or adjust the count and location of the 5G AeroMACS mobile base stations (i.e., the cooperative vehicles) based on the actual needs of the airport surface, to meet sensing needs in different scenarios. The method for scheduling the integrated sensing and communication beams for the multi-base station 5G AeroMACS provides an innovative solution for the safe management and operation of the airport surface.

A cooperative vehicle refers to a vehicle (e.g., a ground handling vehicle, a ferry vehicle, etc.) at the airport surface configured with specialized communication and sensing equipment (e.g., the 5G AeroMACS transceiver array antenna, etc.). In some embodiments, the cooperative vehicle may generate a communication data stream (e.g., a control command) with an auxiliary sensing data stream via a multiple-input multiple-output (MIMO) array, which may combine with a transmit precoding matrix to achieve beam forming.

A non-cooperative vehicle refers to a moving target (e.g., a non-networked cargo, a third-party vehicle with temporary access, etc.) that is not configured with specialized communication and sensing equipment at the airport surface. In some embodiments, the non-cooperative vehicle passively generates measured data (e.g., a relative distance, a relative speed, a relative angle) by reflecting echoes from the beams of the cooperative vehicles.

A sensing target refers to a non-cooperative vehicle or an aircraft not configured with specialized communication equipment and participates passively in the sensing of the system only by reflecting the echoes.

The targets refer to all physical objects in the system that need to be monitored, tracked, or dispatched. In some embodiments, the targets may include the cooperative vehicles and the sensing targets.

Figure 3:
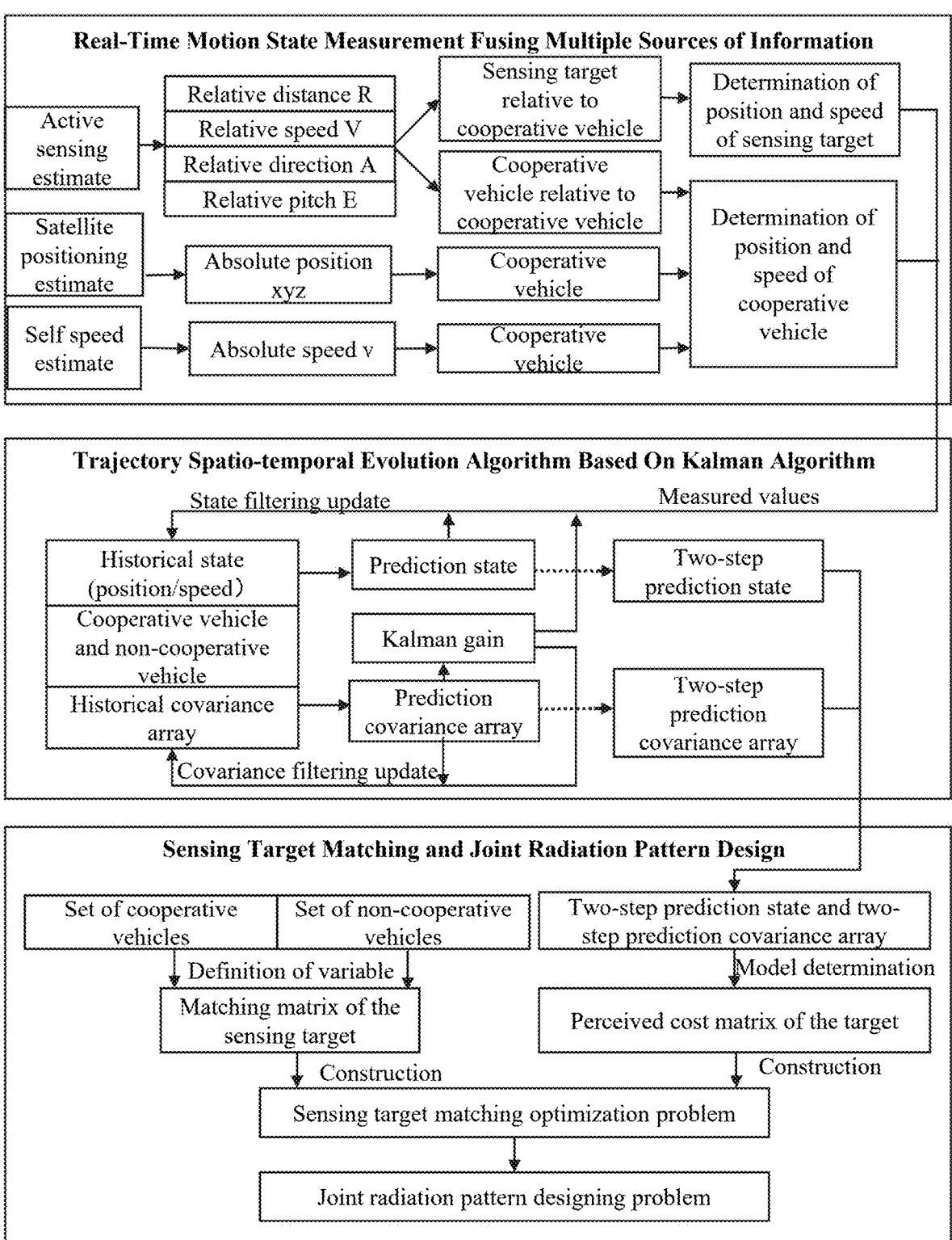
FIG. 3 is a schematic diagram illustrating a scheduling algorithm framework for a method for scheduling integrated sensing and communication beams for a multi-base station 5G AeroMACS according to some embodiments of the present disclosure.

FIG. 2 is a flowchart illustrating an exemplary process of a method for scheduling integrated sensing and communication beams for a multi-base station 5G AeroMACS according to some embodiments of the present disclosure. FIG. 3 is a schematic diagram illustrating a scheduling algorithm framework for a method for scheduling integrated sensing and communication beams for a multi-base station 5G AeroMACS according to some embodiments of the present disclosure.

In some embodiments, as shown in FIGS. 2-3, the scheduling algorithm framework includes when a 5G AeroMACS integrated sensing and communication network of the airport surface serves the communication and sensing of the vehicles at the airport surface, since each of the sensing targets is in a real-time motion state, the embodiment comprehensively consider a plurality of cooperative vehicles to obtain measured information such as positions, speeds, etc., of the plurality of cooperative vehicles and the sensing targets. Information such as the relative distance, the relative speed, and the relative angle between the 5G AeroMACS transceiver array antenna configured on each of the cooperative vehicles and each of the sensing targets is obtained based on the active sensing function of a MIMO wireless system of a 5G AeroMACS integrated sensing and communication mobile base station. The relative distance is estimated by a transceiver delay in transmitting and receiving a signal, the relative speed is estimated by a Doppler frequency deviation of a received signal, and the relative angle is estimated by a phase difference of the received signal arriving at the 5G AeroMACS transceiver array antenna. The satellite positioning system configured in each of the cooperative vehicles is a vehicle-mounted satellite positioning system, and the satellite positioning system obtains absolute position information of each of the cooperative vehicles by capturing a navigation signal broadcast in real-time by the satellite. Each of the cooperative vehicles may also be configured with a speed sensing system, which utilizes devices such as a speedometer (e.g., a wheel speed sensor) integrated in a control system of the cooperative vehicle to obtain absolute speed information of the cooperative vehicle in real time.

In some embodiments, as shown in FIGS. 1-3, the method includes operations S0-S7. The method may be executed by the system.

In S0, the cooperative vehicles at the airport surface are provided, each of the cooperative vehicles is configured with the 5G AeroMACS transceiver array antenna (hereinafter referred to as an array antenna), the satellite positioning system, and the speed sensing system, and the non-cooperative vehicles are designated as the sensing targets.

In some embodiments, there are a plurality of cooperative vehicles. The satellite positioning system is configured to obtain the absolute position information of each of the cooperative vehicles, and the speed sensing system includes the speedometer integrated in the control system of each of the cooperative vehicles. The speedometer may be the wheel speed sensor, etc. The sensing target may also include the aircraft on the airport surface. Each of the cooperative vehicles configured with the array antenna, the satellite positioning system, and the speed sensing system may be designated as the 5G AeroMACS mobile base station.

Figure 4:
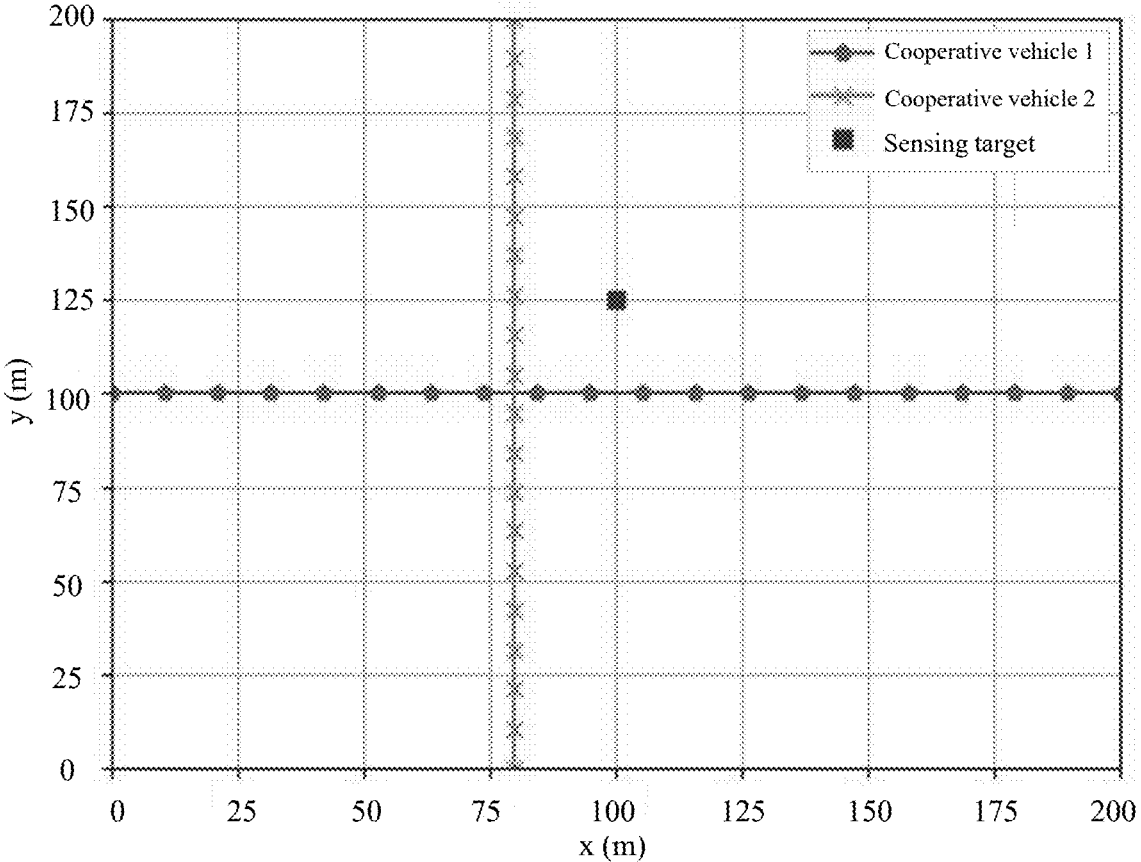
FIG. 4 is a schematic diagram illustrating an application scenario of a method for scheduling integrated sensing and communication beams for a multi-base station 5G Aero-MACS according to some embodiments of the present disclosure.
Figure 5:
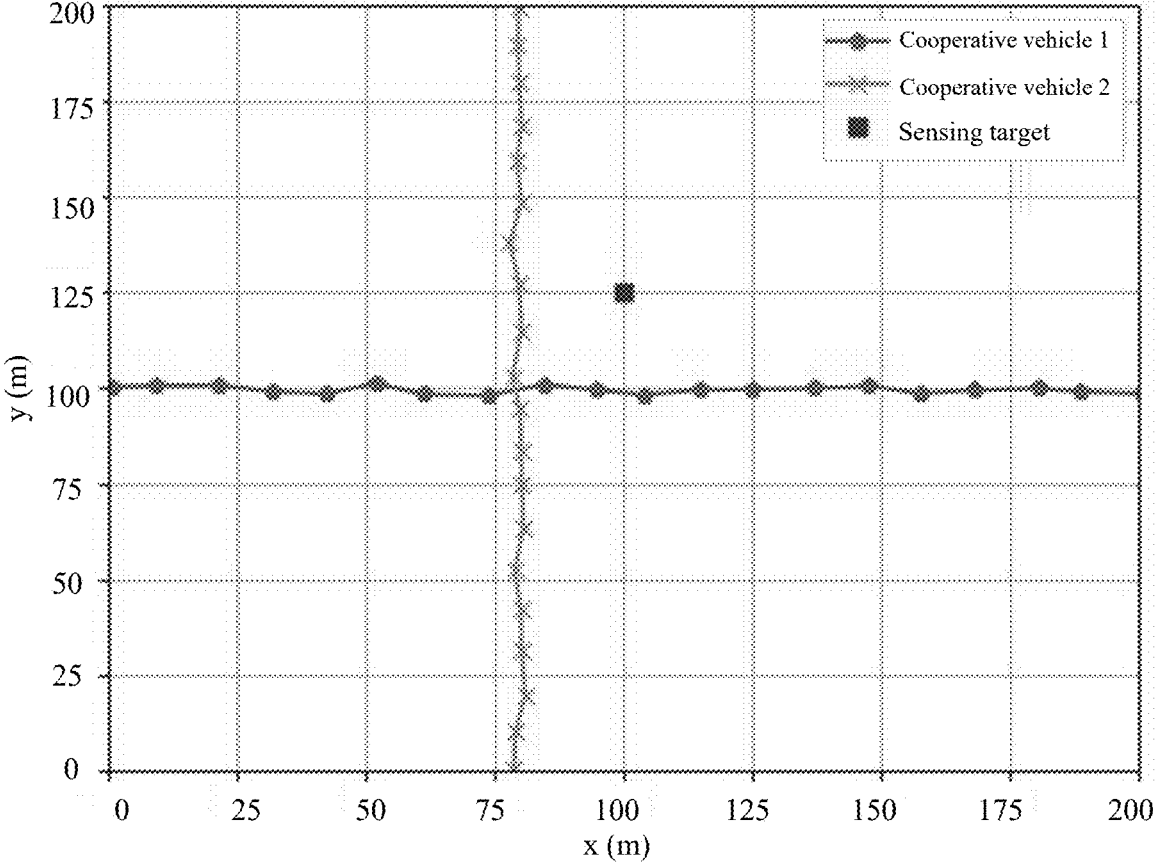
FIG. 5 is a schematic diagram illustrating a trajectory spatio-temporal evolution result obtained by applying a method for scheduling integrated sensing and communication beams for a multi-base station 5G AeroMACS according to some embodiments of the present disclosure.

FIG. 4 is a schematic diagram illustrating an application scenario of a method for scheduling integrated sensing and communication beams for a multi-base station 5G AeroMACS according to some embodiments of the present disclosure FIG. 5 is a schematic diagram illustrating a trajectory spatio-temporal evolution result obtained by applying a method for scheduling integrated sensing and communication beams for a multi-base station 5G AeroMACS according to some embodiments of the present disclosure.

In S1, a 5G AeroMACS integrated sensing and communication network of an airport surface is established based on the cooperative vehicles and the sensing targets, and targets include the cooperative vehicles and the sensing targets.

In some embodiments, a technician may set a count of cooperative vehicles to be N, a count of sensing targets to be M, and a true state vector of l-th target at a moment of a current frame t of a current round is:

$$\bar{v}_{l,t} = \left[ \bar{x}_{l,t}, \bar{y}_{l,t}, \bar{v}_{x,l,t}, \bar{v}_{y,l,t} \right]^T, l = 1, 2, \dots N, \dots, N+M$$

In the equation, l denotes the index of the target and l=1, . . . , (N+M), $\bar{x}_{l,t}$ denotes the horizontal position of the l-th target, $\bar{y}_{l,t}$ denotes the vertical position of the l-th target, $\bar{v}_{x,l,t}$ denotes the horizontal speed of the l-th target, $\bar{v}_{y,l,t}$ denotes the vertical speed of the l-th target, $(\bar{x}_{l,t}, \bar{y}_{l,t})$ is designated as a true position of the l-th target, and (vx,l,t, $\bar{v}_{y,l,t}$) is designated as a true speed of the l-th target.

A horizontal direction and a vertical direction are perpendicular to each other in a plane in which a target moves. The horizontal direction may be an x-axis direction as shown in FIG. 4 and FIG. 5; the vertical direction may be a y-axis direction as shown in FIG. 4 and FIG. 5. t denotes a frame number and represents a current frame of the current round. In the embodiment, each frame represents a moment in time, and a frame interval may be set as desired. For example, a technician may set a first frame t=1 corresponding to a 0.1 s moment, a second frame t=2 corresponding to a 0.2 s moment, a third frame t=3 corresponding to a 0.3 s moment, and so on. The frame interval may also be set to other times as desired.

In some embodiments, a true state vector of a target may be expressed as a true state vector of a cooperative vehicle and a true state vector of a sensing target, respectively. i denotes the index of the cooperative vehicle and i=1, . . . , N, $\bar{x}_{i,t}$ denotes the horizontal position of the i-th cooperative vehicle, $\bar{y}_{i,t}$ denotes the vertical position of the i-th cooperative vehicle, $\bar{v}_{x,i,t}$ denotes the horizontal speed of the i-th cooperative vehicle, $\bar{v}_{y,i,t}$ denotes the vertical speed of the i-th cooperative vehicle, $(\bar{x}_{i,t}, \bar{y}_{i,t})$ denotes the true position of the i-th cooperative vehicle, $(\bar{v}_{x,i,t}, \bar{v}_{y,i,t})$ denotes the true speed of the i-th cooperative vehicle; j denotes the index of the sensing target and j=(N+1), . . . , (N+M), $\bar{x}_{j,t}$ denotes the horizontal position of the j-th sensing target, $\bar{y}_{j,t}$ denotes the vertical position of the j-th sensing target, $\bar{v}_{i,t}$ denotes the horizontal speed of the j-th sensing target, $\bar{v}_{y,j,t}$ denotes the vertical speed of the j-th sensing target, $(\bar{x}_{j,t}, \bar{y}_{j,t})$ denotes the true position of the j-th sensing target, and $(\bar{v}_{x,j,t}, \bar{v}_{y,j,t})$ denotes the true speed of the j-th sensing target. The target includes the cooperative vehicle and the sensing target. When l=1, . . . , N, the l-th target corresponds to the i-th cooperative vehicle. When l=(N+1), . . . , (N+M), the l-th target corresponds to the i-th sensing target.

In some embodiments, the true state vectors of all targets at a current frame moment may be obtained by obtaining the true state vector of each of the cooperative vehicles and the true state vector of each of the sensing targets, respectively.

The true state vector refers to a mathematical model for accurately describing the actual motion state of a target in a two-dimensional plane. For example, the true state vector may include a true position, a true speed, etc. In some embodiments, the true state vector may be obtained by a skilled person via specialized communication and sensing equipment. More descriptions regarding obtaining the position and the speed of the target may be found in related descriptions hereinafter.

In S2, a measurement model is established, including establishing an active sensing model, a satellite positioning model of the cooperative vehicles, and a self speed model of the cooperative vehicles, and measurements are performed to obtain a measurement set at the current frame moment.

In some embodiments, an array antenna configured on a cooperative vehicle transmits a signal, while reflected echoes of the targets (including the cooperative vehicles and the sensing targets) are obtained by the array antenna, a transceiver signal correlation manner is utilized to realize an estimation of a relative distance, a relative speed, and a relative angle of the cooperative vehicle with respect to the targets after sampling and lowering the side frequency to a baseband, so as to establish the active sensing model. The cooperative vehicle utilizes a satellite positioning module to obtain the estimation of the position of the cooperative vehicle, so as to establish the satellite positioning model of the cooperative vehicle. The cooperative vehicle utilizes a speedometer configured on the cooperative vehicle to obtain a display speed of the speedometer, to establish the self speed model of the cooperative vehicle.

The active sensing model refers to a mathematical model in which the cooperative vehicle utilizes the 5G AeroMACS transceiver array antenna, actively transmits integrated sensing and communication signals, and estimates the state of the targets through echo processing. In some embodiments, the active sensing model may be constructed by a technician on demand. More descriptions regarding constructing the active sensing model may be found in related descriptions hereinafter.

S2 includes the following operations.

In S2.1, the active sensing model is constructed.

Merely by way of example, the system may construct the active sensing model by equations (1), (2), and (3).

$$\check{R}_{i,l,t} = \sqrt{\left(\check{x}_{i,t} - \check{x}_{l,t}\right)^2 + \left(\check{y}_{i,t} - \check{y}_{l,t}\right)^2} + n(\check{R}_{i,l,t}); \tag{1}$$

$$\check{V}_{i,l,t} = \frac{\left(\check{x}_{i,t} - \check{x}_{l,t}\right)\cdot\left(\check{v}_{x,i,t} - \check{v}_{x,l,t}\right) + \left(\check{y}_{i,t} - \check{y}_{l,t}\right)\cdot\left(\check{v}_{y,i,t} - \check{v}_{y,l,t}\right)}{\sqrt{\left(\check{x}_{i,t} - \check{x}_{l,t}\right)^2 + \left(\check{y}_{i,t} - \check{y}_{l,t}\right)^2}} + n(\check{V}_{i,l,t}); \tag{2}$$

$$\tilde{A}_{i,l,t} = \arctan2\left(\frac{\check{y}_{i,t} - \check{y}_{l,t}}{\check{x}_{i,t} - \check{x}_{l,t}}\right) + n(\tilde{A}_{i,l,t}). \tag{3}$$

In equations (1), (2) and (3), i denotes the index of the cooperative vehicle and i=1, . . . , N, the symbol $\check{\phantom{x}}$ denotes the measured value, $\check{R}_{i,l,t}$ denotes the measured value of the relative distance between the i-th cooperative vehicle and the l-th target, $\check{x}_{i,t}$ denotes the horizontal position of the i-th cooperative vehicle, $\check{y}_{i,t}$ denotes the vertical position of the i-th cooperative vehicle, $\check{V}_{i,l,t}$ denotes the measured value of the relative speed between the i-th cooperative vehicle and the l-th target, $\check{v}_{x,i,t}$ denotes the horizontal speed of the i-th cooperative vehicle, $\check{v}_{y,i,t}$ denotes the vertical speed of the i-th cooperative vehicle, $\tilde{A}_{i,l,t}$ denotes the measured value of the angle between the i-th cooperative vehicle and the l-th target, and n($\cdot$) denotes the measured noise.

In S2.2, the satellite positioning model of the cooperative vehicles is constructed based on the satellite positioning system configured on the cooperative vehicles.

Merely by way of example, the system may construct the satellite positioning model of the cooperative vehicle based on the satellite positioning system configured in the cooperative vehicle by equations (4) and (5):

$$\tilde{x}_{i,t} = \check{x}_{i,t} + n(\tilde{x}_{i,t}); \tag{4}$$

$$\tilde{y}_{i,t} = \check{y}_{i,t} + n(\tilde{y}_{i,t}). \tag{5}$$

In equations (4) and (5), $\tilde{x}_{i,t}$ denotes the horizontal position of the i-th cooperative vehicle obtained by the satellite positioning system, and $\tilde{y}_{i,t}$ denotes the vertical position of the i-th cooperative vehicle obtained by the satellite positioning system. Thus, a measured value of the position of the i-th cooperative vehicle may be obtained as ($\tilde{x}_{i,t}$, $\tilde{y}_{i,t}$).

In S2.3, the self speed model of the cooperative vehicles is constructed based on the speed sensing system configured on the cooperative vehicles.

Merely by way of example, the system may construct the self speed model of the cooperative vehicles through equation (6):

$$\tilde{v}_{i,t} = \sqrt{\check{v}_{x,i,t}^2 + \check{v}_{y,i,t}^2} + n(\tilde{v}_{i,t}). \tag{6}$$

In equation (6), $\tilde{v}_{i,t}$ denotes the display speed of the speedometer of the i-th cooperative vehicle. Thus, a measured value of the speed of the i-th cooperative vehicle may be obtained as $\tilde{v}_{i,t}$.

In S2.4, corresponding signal processing and target parameter estimation is performed based on target reflected echoes of sensing beams emitted in a previous iteration to obtain measured values of positions and measured values of speeds of the sensing targets at the current t-th frame moment of a current round, and for a first iteration, the measured values of positions and the measured values of speeds of the sensing targets are measured values of preset positions and measured values of speeds of the sensing targets.

In S2.5, a measurement result is obtained through the active sensing model, the satellite positioning model of the cooperative vehicles, and the self speed model of the cooperative vehicles, and the measurement set at the current frame moment is obtained, where the measurement set includes the current frame moment, measured values of relative distances between the cooperative vehicles and the targets, measured values of relative speeds between the cooperative vehicles and the targets, measured values of relative angles between the cooperative vehicles and the targets, and measurement results of the targets; the measurement results of the targets are measured values of positions and measured values of speeds of the targets, including measured values of positions and measured values of speeds of the cooperative vehicles, and measured values of the positions and measured values of the speeds of the sensing targets.

In some embodiments, the system may obtain a measurement result of each of the targets based on the measured values of the positions and the measured values of the speeds of the cooperative vehicles, and the measured values of the positions and the measured values of the speeds of the sensing targets. The measurement result is denoted as a measurement result $\tilde{z}_{l,t}$ of the l-th target at the t-th frame, including a measured value of the position and a measured value of the speed of the l-th target at the t-th frame.

In some embodiments of the present disclosure, the measured values of the positions and the measured values of the speeds of all targets, and the relative distances, the relative speeds, and the relative angles between each of the cooperative vehicles and all targets at the current frame moment may be obtained by constructing the active sensing model, the satellite positioning model, and the self speed model.

In S3, a trajectory evolution model is constructed based on a Kalman filtering algorithm to portray motion states of the cooperative vehicles and the sensing targets in a real coordinate system.

In some embodiments, the trajectory evolution model may include a Kalman prediction model, a trajectory filtering model, a trajectory prediction model, etc. The trajectory evolution model is realized based on the Kalman filtering algorithm, including the trajectory filtering and the trajectory prediction, to obtain a trajectory filtering result and a trajectory prediction result of the motion states of the cooperative vehicle and the sensing targets. The trajectory filtering refers to a process of outputting a trajectory state estimate $\hat{v}_{l,t}$ at the t-th frame based on a trajectory state estimate $\hat{v}_{l,t-1}$ of the (t−2)-th frame and a measurement result $\tilde{z}_{l,t-1}$ at the (t−1)-th frame. The measurement result $\tilde{z}_{l,t-1}$ at the t-th frame is the measurement result of the target (i.e., the cooperative vehicle or the sensing target) at the (t−1)-th frame obtained in the previous round of the operation S2, including the measurement value of position and the measurement value of speed of the target (i.e., the cooperative vehicle or the sensing target) at the t-th frame obtained in the operation S2.4. The trajectory prediction refers to a process of outputting a trajectory state estimate $\tilde{v}_{l,t-1}$ at t-th frame based on a trajectory state estimate $\tilde{v}_{l,t-1}$ at the (t−1)-th frame.

S3 includes the following operations.

In S3.1, for all targets, the Kalman prediction model is constructed based on trajectory state predictions and trajectory prediction covariance arrays of the targets of the previous two rounds and trajectory state one-step predictions and trajectory one-step prediction covariance arrays of the targets are obtained.

In some embodiments, the Kalman prediction model is constructed as follows, and the system may construct the Kalman prediction model by one of a plurality of manners as follows based on the judgment at the t-th current frame.

When t=1 (i.e., at the first round of iteration), the system may construct the Kalman prediction model based on initialized states of the targets and preset initialized trajectory filtering covariance arrays of the targets through equations (7) and (8):

$$\hat{v}_{l,t-1}^{+} = \hat{v}_{l,0}; \tag{7}$$

$$\hat{P}_{l,t-1}^{+} = \hat{P}_{l,0}. \tag{8}$$

In the equation, $$\hat{v}_{l,t-1}^{+}$$

denotes the trajectory state one-step prediction of the l-th target at the (t−1)-th frame, $$\hat{P}_{l,t-1}^{+}$$

denotes the trajectory one-step prediction covariance array of the l-th target at the t-th frame, $\tilde{v}_{l,0}$ denotes the initialized state of the l-th target and $\tilde{v}_{l,o} = \tilde{v}_{i,0} + [\tilde{R}_{i,l,0} \cos(\tilde{A}_{i,l,0}), \tilde{R}_{i,l,0} \sin(\tilde{A}_{i,l,0}), \tilde{V}_{i,l,0}, \tilde{R}_{i,l,0}]^T$, $\hat{v}_{i,0}$ denotes the initialized state of the i-th cooperative vehicle and $\hat{v}_{i,0} = [\hat{x}_{i,0}, \hat{y}_{i,0}, \hat{v}_{i,0}, \hat{v}_{i,0}]^T$, and $\hat{P}_{l,o}$ denotes the initialized trajectory filtering covariance array of the l-th target.

When t=2, the system may construct the Kalman prediction model based on the initialized states of the targets and the preset initialized trajectory filter covariance arrays of the targets through equations (9), (10), and (11):

$$\hat{v}_{l,t-1}^{+} = F\hat{v}_{l,0}; \tag{9}$$

$$\hat{P}_{l,t-1}^{+} = F\hat{P}_{l,0}F^{T} + Q_l; \tag{10}$$

$$F = I_2 \otimes \begin{bmatrix} 1 & \delta t \\ 0 & 1 \end{bmatrix}. \tag{11}$$

In the equations, at the second round of iteration, the initialized trajectory filtering covariance array $\hat{P}_{l,o}$ of the l-th target is set as a unit array, $Q_l$ denotes the preset covariance array for the process noise of the l-th target, $\delta t$ denotes the frame interval, F denotes the state transfer matrix, and $I_2$ denotes the 2×2 unit matrix. At the second round of iteration, the initialized trajectory filtering covariance array $\hat{P}_{l,o}$ of the l-th target is set as a unit array. The frame interval $\delta t$ may be set as desired (e.g., 0.1 sec, 1 sec, 2 sec, 3 sec, etc.). The frame interval may also be set to other times as required.

When t>2, the system may construct the Kalman prediction model based on the trajectory state estimates and the trajectory filtering covariance arrays of the targets obtained at the first two rounds of iteration through equations (12), (13), and (14):

$$\hat{v}_{l,t-1}^{+} = F\hat{v}_{l,t-2}; \tag{12}$$

$$\hat{P}_{l,t-1}^{+} = F\hat{P}_{l,t-2}F^{T} + Q_l; \tag{13}$$

$$F = I_2 \otimes \begin{bmatrix} 1 & \delta t \\ 0 & 1 \end{bmatrix}. \tag{14}$$

In the equations, $$\hat{v}_{l,t-1}^{+}$$

denotes the trajectory state one-step prediction of the l-th target at the (t−1)-th frame, $$\hat{P}_{l,t-1}^{+}$$

denotes the trajectory one-step prediction covariance array of the l-th target at the t-th frame, $\hat{v}_{l,t-2}$ denotes the trajectory state estimate of the l-th target at the (t−2)-th frame, and $\hat{P}_{l,t-2}$ denotes the trajectory filtering covariance array of the l-th target at the (t−2)-th frame.

In some embodiments, the system may obtain the trajectory state one-step prediction $$\hat{v}^+_{l,t-1}$$

of the l-th target at the (t−1)-th frame and the trajectory one-step prediction covariance array $$\hat{P}^+_{l,t-1}$$

of the l-th target at the (t−1)-th frame at the current round of iteration through the Kalman prediction model based on the trajectory state estimate $\hat{v}_{l,t-2}$ of the l-th target at the (t−2)-th frame and the trajectory filtering covariance array $\hat{P}_{l,t-2}$ of the l-th target at the (t−2)-th frame obtained at the first two rounds of iterations (i.e., the (t−2)-th frame of the second previous round).

In S3.2, the trajectory filtering model is constructed based on a measurement correlation result of a minimum Mahalanobis distance through a trajectory updating process, and the trajectory state estimate and the trajectory filtering covariance arrays of the targets are obtained.

In some embodiments, the system may construct the trajectory filtering model based on the trajectory filtering estimates of the targets obtained from the first two rounds of iterations and the trajectory state one-step predictions and the trajectory one-step prediction covariance arrays of the targets obtained in operation S3.1 through the trajectory updating process as in equations (15), (16), and (17):

$$K_{l,t-1} = \hat{P}^+_{l,t-1} G^T_{l,t-1} \left( G_l \hat{P}^+_{l,t-1} G^T_{l,t-1} + R_l \right)^{-1}; \tag{15}$$

$$\hat{v}_{l,t-1} = \hat{v}^+_{l,t-1} + K_{l,t-1} \left( \tilde{z}_{l,t-1} - G^T_{l,t-1} \hat{v}^+_{l,t-1} \right); \tag{16}$$

$$\hat{P}_{l,t-1} = \left( I - K_{l,t-1} G^T_{l,t-1} \right) \hat{P}^+_{l,t-1}. \tag{17}$$

In equations (15), (16), and (17), $K_{l,t-1}$ denotes the Kalman gain matrix of the l-th target at the (t−1)-th frame, $$\hat{P}^+_{l,t-1}$$

denotes the trajectory one-step prediction covariance array of the l-th target at the (t−1)-th frame, $$\hat{v}^+_{l,t-1}$$

denotes the trajectory state one-step prediction of the l-th target at the (t−1)-th frame, $\tilde{z}_{l,t-1}$ denotes the measurement result of the l-th target at the (t−1)-th frame, $R_l$ denotes the covariance array of the measured noise of the l-th target, $G_{l,t-1}$ denotes the Jacobi matrix of a measurement model related to the true state vector $\overline{v}_{l,t-1}$, and $$G^T_{l,t-1}$$

denotes a transposition matrix of the $G_{l,t-1}$, I denotes the unit matrix. $R_l$ may be a preset value, and $G_{l,t-1}$c may be determined by Jacobian computation.

In some embodiments, the system may obtain, by the trajectory filtering model, the trajectory state estimate $\hat{v}^+_{l,t-1}$ of the l-th target at the (t−1)-th frame and the trajectory filtering covariance array $\hat{P}_{l,t-1}$ of the l-th target at the (t−1)-th frame based on the trajectory filtering estimate $\hat{v}_{l,t-2}$ of the l-th target at the (t−2)-th frame obtained at the first two rounds of iterations, the trajectory state one-step prediction $$\hat{v}^+_{l,t-1}$$

of the l-th target at the (t−1)-th frame and the trajectory one-step prediction covariance array $$\hat{P}^+_{l,t-1}$$

of the l-th target at the (t−1)-th frame obtained in operation S3.1 at the current round of iteration, and the measurement result $\tilde{z}_{l,t-1}$ of the l-th target at the (t−1)-th frame obtained in operation S2 of the previous round of iteration.

At the first round of iteration (when t=1), the trajectory filtering estimate of the l-th target at the (t−2)-th frame is $\hat{v}_{l,t-2}$, the system uses the initialized state of the l-th target and $\hat{v}_{l,0}=\hat{v}_{l,0}+[\tilde{R}_{i,l,0} \cos(\tilde{A}_{i,l,0}), \tilde{R}_{i,l,0} \sin(\tilde{A}_{i,l,0}), \tilde{V}_{i,l,0}, \tilde{V}_{i,l,0}]^T$. $\hat{v}_{i,0}$ denotes the initialized state of the i-th cooperative vehicle and $\hat{v}_{i,0}=[\tilde{x}_{i,0}, \tilde{y}_{i,0}, \tilde{v}_{i,0}, \tilde{v}_{i,0}]^T$, and the system uses the preset initialized measurement result of the l-th target $\tilde{z}_{l,0}$. Similar to the first round of iteration, at the second round of iteration (when t=2, the trajectory filtering estimate of the l-th target at the (t−2)-th frame is $\hat{v}_{l,t-2}$, the system uses the initialized state of the l-th target and $\hat{v}_{l,0}=\hat{v}_{l,0}+[\tilde{R}_{i,l,0} \cos(\tilde{A}_{i,l,0}), \tilde{R}_{i,l,0} \sin(\tilde{A}_{i,l,0}), \tilde{V}_{i,l,0}, \tilde{V}_{i,l,0}]^T$. $\hat{v}_{i,0}$ denotes the initialized state of the i-th cooperative vehicle and $\hat{v}_{i,0}=[\tilde{x}_{i,0}, \tilde{y}_{i,0}, \tilde{v}_{i,0}, \tilde{v}_{i,0}]^T$, and the system uses the measurement result $\tilde{z}_{l,1}$ of the l-th target at the first frame obtained at the first round of iteration. At the third round of iteration (when t=3), the trajectory filtering estimate of the l-th target at the (t−2)-th frame is $\hat{v}_{l,t-2}$, and the system uses the trajectory filtering estimate of the l-th target obtained at the first round of iteration, and so on for subsequent rounds.

In S3.3, the trajectory prediction model is constructed based on the trajectory state estimates and the trajectory filtering covariance arrays of the targets, and the trajectory state predictions and the trajectory prediction covariance arrays of the targets at the current round are obtained.

In some embodiments, the system may construct the trajectory prediction model based on the trajectory state estimates and the trajectory filtering covariance arrays of the targets obtained in operation S3.2 by equations (18) and (19):

$$\hat{v}^-_{l,t} = F\hat{v}_{l,t-1}; \tag{18}$$

$$\hat{P}^-_{l,t} F\hat{P}_{l,t-1}F^T + Q_l. \tag{19}$$

In the equations, $$\hat{v}^-_{l,t}$$

denotes the trajectory state prediction of the l-th target at the t-th frame, and $$\hat{P}_{l,t}^-$$

denotes the trajectory prediction covariance array of the l-th target at the t-th frame.

In some embodiments, the system may obtain the trajectory state prediction $$\hat{v}_{l,t}^-$$

of the l-th target at the t-th frame and the trajectory prediction covariance array $$\hat{P}_{l,t}^-$$

of the l-th target at the t-th frame, which are used as the result of the current round of iteration, based on the trajectory state estimate $\hat{v}_{l,t-1}$ of the l-th target at the (t−1)-th frame and the trajectory filtering covariance array $\hat{P}_{l,t-1}$ of the l-th target at the (t−1)-th frame obtained in operation S3.2 at the current round of iteration by the trajectory prediction model, to realize the trajectory state prediction and the trajectory prediction covariance array of the target at the t-th frame.

In S3.4, detection of all targets is judged, a count of consecutive undetected frames of a plurality of targets is compared with a preset exit frame threshold, and a target for which the count of consecutive undetected frames is greater than or equal to the preset exit frame threshold is determined as a target extinction, where the target exits a trajectory filtering loop; and for a target for which the count of consecutive undetected frames is less than the preset exit frame threshold, the trajectory state predictions and the trajectory prediction covariance arrays obtained for the current round are saved as a trajectory filtering result and a trajectory prediction result of the target.

For example, in response to determining that a count of consecutive undetected frames of the l-th target is greater than or equal to the preset exit frame threshold, the system may consider that the l-th target is out of a detection range, does not save data of the l-th target and do not detect the l-th target anymore, exits the trajectory filtering loop for the l-th target, and determines the target extinction. In response to determining that the count of consecutive undetected frames of the l-th target is less than the preset exit frame threshold, the system saves the trajectory state prediction $$\hat{v}_{l,t}^-$$

of the l-th target at the t-th frame and the trajectory prediction covariance array $$\hat{P}_{l,t}^-$$

of the l-th target at the t-th frame as the trajectory filtering result and the trajectory prediction result of the current target.

The trajectory filtering refers to a process of state estimation and noise suppression on a target trajectory through filtering algorithms (e.g., Kalman filtering, particle filtering, etc.) to predict a future position and correct a measurement error.

The preset exit frame threshold refers to a preset parameter for determining whether a target should be moved out of a tracking list. In some embodiments, the preset exit frame threshold may be set by a technician on demand.

In some embodiments of the present disclosure, through the Kalman prediction model, the trajectory filtering model, and the trajectory prediction model, the trajectory evolution model is constructed. The trajectory evolution model provides the trajectory filtering result and trajectory prediction result for scheduling the integrated sensing and communication beams for the multi-base station 5G AeroMACS.

In some embodiments, the system may compare the count of consecutive undetected frames of the plurality of targets with a plurality of preset exit frame thresholds corresponding to the plurality of targets. The plurality of preset exit frame thresholds corresponding to the plurality of targets are determined at the first time point corresponding to the plurality of targets. The first time point corresponding to the plurality of targets refers to a time point nearest to a current time point at which the plurality of targets are detected.

In some embodiments, the process of determining the plurality of preset exit frame thresholds corresponding to the plurality of the targets includes determining predictive confidence levels of the plurality of targets based on positions of the plurality of targets and an environmental complexity value of an airport and determining the plurality of preset exit frame thresholds corresponding to the plurality of targets based on the predictive confidence levels of the plurality of targets, motion data of the plurality of targets, and the environmental characteristics.

The environmental complexity value is used to measure a complexity of an environmental characteristic. The environmental characteristic refers to a characteristic associated with an environment of the airport. For example, the environmental characteristic may include a count or a density of electromagnetic interference devices in the airport, meteorological data (e.g., rainfall, high wind, etc.), environmental data (e.g., temperature, humidity, etc.), etc., of the airport. In some embodiments, the environmental complexity value is determined based on the environmental characteristic. For example, the environmental complexity value is correlated to the count or the density of the electromagnetic interference devices in the airport. As another example, the environmental complexity value is correlated to changes in the meteorological data and/or environmental data during a historical time period at the airport.

A predictive confidence level is used to measure a confidence level of a prediction result. In some embodiments, the system may perform a normalization process on the location and the environmental complexity value of each target separately, then perform a weighted sum, and use a result of the weighted sum as the predictive confidence level of each target. The normalization process may include Min-Max normalization, etc. Weighting coefficients of the weighted sum may be set based on experience.

The system may obtain the predictive confidence levels of the plurality of targets based on the above manner.

Motion data of a target refers to data related to the motion of the target. For example, the motion data may include a motion speed, an acceleration, a motion direction, etc. In some embodiments, the motion data may be obtained by the speed sensing system. More descriptions regarding the speed sensing system may be found in operation S0 of FIG. 2 and related descriptions thereof.

In some embodiments, the system may determine the preset exit frame threshold by a threshold determination model. The threshold determination model may be a machine learning model. For example, the threshold determination model may be any one or combination of a deep neural network (DNN) model, etc., or other customized model structures, etc.

In some embodiments, inputs of the threshold determination model include a predictive confidence level, motion data, and an environmental characteristic, and outputs of the threshold determination model include the preset exit frame threshold. In some embodiments, the threshold determination model may be obtained by training based on a plurality of training samples with a plurality of labels.

In some embodiments, the training samples may include a predictive confidence level, motion data, and an environmental characteristic in historical data that satisfy a preset requirement. The preset requirement may include that a missed value of moving targets in the airport recognized by the system is less than a preset threshold under the conditions of the predictive confidence level, the motion data, and the environmental characteristic. The labels may be an actual preset exit frame threshold corresponding to the training sample. The preset threshold may be set based on experience. In some embodiments, the plurality of training samples may be obtained based on the historical data, and the plurality of labels may be obtained based on manual labeling, etc.

In some embodiments of the present disclosure, the moving targets in the airport may be effectively avoided from being missed by dynamically adjusting the preset exit frame threshold, which reduces the occurrence of safety accidents.

In some embodiments, the system may also determine the plurality of preset exit frame thresholds corresponding to the plurality of targets based on the predictive confidence levels, the motion data, the environmental characteristics, and perceptual importance values of the plurality of targets. The perceptual importance values of the plurality of targets are related to the positions of the plurality of targets.

In some embodiments, the inputs of the threshold determination model further include a perceptual importance value of a target. When the inputs of the threshold determination model include the perceptual importance value of the target, the training samples of the threshold determination model also include a perceptual importance value of a target in the historical data that satisfies the preset requirement.

The perceptual importance value is used to measure the importance of a target to be perceived. In some embodiments, the system may pre-count the usage frequency of each region of the airport per unit of time based on the type of the region of the airport (e.g., whether the region is an aircraft flight path or a region for human activity). For example, in response to determining that the region is the aircraft flight path, the system counts the usage frequency of the region used by aircraft per unit of time. As another example, in response to determining that the region is the region for human activity, the system counts the frequency of human activity per unit of time. The unit of time may be set based on experience.

Furthermore, the system may determine the usage frequency of the region based on the region in which the target is located, determine an importance value of the region, and use the importance value as the perceptual importance value of the target. The importance value of the region is positively correlated to the usage frequency of the region. The higher the usage frequency of the region, the greater the importance value of the region. In some embodiments, the importance value of the region may be characterized by the usage frequency of the region per unit of time.

In some embodiments of the present disclosure, the usage frequency of the region is positively correlated with the probability of missing the target. Therefore, determining the perceptual importance value of the target based on the usage frequency of the region and inputting the perceptual importance value of the target into the threshold determination model may further improve the accuracy of the output result of the threshold determination model, to further avoid the occurrence of sensing omissions and reduce the occurrence of safety accidents.

In S4, the cooperative vehicles and a plurality of targets are matched to obtain targets assigned to a plurality of cooperative vehicles at the current frame moment.

In some embodiments, due to the presence of N cooperative vehicles and M sensing targets in the 5G AeroMACS integrated sensing and communication network of the airport surface, to simplify the complexity of the algorithm, the system may match the cooperative vehicles with the plurality of targets to ensure the detection of the plurality of targets by the cooperative vehicles at the airport surface.

S4 includes the following operations.

In S4.1, trajectory state estimates of a plurality of cooperative vehicles and a plurality of sensing targets are sampled based on the trajectory state predictions and the trajectory prediction covariance arrays of the targets, a set count of sigma points are sampled, and state vectors and positions of a plurality of sampled sigma points are obtained.

In some embodiments, in the actual calculation, since a true distance and a true angle are unknown, the system may adopt the trajectory prediction result of the j-th sensing target and the i-th cooperative vehicle obtained in operation S3 to approximately replace the true distance and the true angle. First, the system samples the trajectory state estimate of each cooperative vehicle and each sensing target, and samples $L = 2\alpha + 1$ sigma points respectively for an approximate posterior distribution. A state vector and a position of each sampled sigma point are obtained by the following equations (20) and (21):

$$
v_{i,k_i,t} = \begin{cases} \hat{v}_{i,t}^- + \left(\sqrt{\alpha \hat{P}_{i,t}^-}\right)_{k_i}, & k_i = 1, 2, \ldots, \alpha \\ \hat{v}_{i,t}^-, & k_i = \alpha + 1 \\ \hat{v}_{i,t}^- - \left(\sqrt{\alpha \hat{P}_{i,t}^-}\right)_{L-k_i+1}, & k_i = \alpha + 2, \ldots, L; \end{cases} \tag{20}
$$

$$
\hat{x}_{i,k_i,t} = v_{i,k_i,t}(1), \; \hat{y}_{i,k_i,t} = v_{i,k_i,t}(3)
$$

$$
v_{j,k_j,t} = \begin{cases} \hat{v}_{j,t}^- + \left(\sqrt{\alpha \hat{P}_{j,t}^-}\right)_{k_j}, & k_j = 1, 2, \ldots, \alpha \\ \hat{v}_{j,t}^-, & k_j = \alpha + 1 \\ \hat{v}_{j,t}^- - \left(\sqrt{\alpha \hat{P}_{j,t}^-}\right)_{L-k_j+1}, & k_j = \alpha + 2, \ldots, L. \end{cases} \tag{21}
$$

$$
\hat{x}_{j,k_j,t} = v_{j,k_j,t}(1), \; \hat{y}_{j,k_j,t} = v_{j,k_j,t}(3).
$$

In equations (20) and (21), $k_i$ denotes the index of a sigma point sampled from the trajectory state estimate of the i-th cooperative vehicle and $k_i = 1, 2, \ldots, L$, $\hat{x}_{i,k_i,t}$ denotes the horizontal position of the $k_i$-th sigma point of the i-th cooperative vehicle at the t-th frame, $V_{i,k_i,t}$ denotes the state vector of the $k_i$-th sigma point of the i-th cooperative vehicle in the t-th frame, $\hat{y}_{i,k_i,t}$ denotes the vertical position of the $k_i$-th sigma point of the i-th cooperative vehicle at the t-th frame, $k_j$ denotes the index of the sigma point sampled from the trajectory state estimate of the j-th sensing target and $k_j$=1,2, . . . , L, $\hat{x}_{j,k_{j,t}}$ denotes the horizontal position of the $k_j$-th sigma point the j-th sensing target at the t-th frame, $v_{j,k_{j,t}}$ denotes the state vector of the $k_j$-th sigma point of the j-th sensing target at the t-th frame, $\hat{y}_{j,k_{j,t}}$ denotes the vertical position of the $k_j$-th sigma point of the j-th sensing target at the t-th frame, $v_{j,k_{j,t}}$ denotes the state vector of the $k_j$-th sigma point of the j-th sensing target at the t-th frame, $$\hat{v}_{i,t}^-$$

denotes the state vector of the i-th cooperative vehicle at the t-th frame, $$\hat{P}_{i,t}^-$$

denotes the trajectory prediction covariance array of the i-th cooperative vehicle at the t-th frame, $$\hat{v}_{j,t}^-$$

denotes the state vector of the the j-th sensing target at the t-th frame, and $$\hat{P}_{j,t}^-$$

denotes the covariance array of the j-th sensing target at the t-th frame. The trajectory prediction covariance array $$\hat{P}_{i,t}^-$$

of the i-th cooperative vehicle and the trajectory prediction covariance array $$\hat{P}_{j,t}^-$$

of the j-th sensing target are obtained based on the trajectory prediction covariance array $$\hat{P}_{l,t}^-$$

of the target at the t-th frame in operation S3.3. The state vector $\hat{v}$ of the i-th cooperative vehicle and the state vector $$\hat{v}_{j,t}^-$$

of the j-th sensing target are obtained based on the trajectory state prediction $$\hat{v}_{l,t}^-$$

of the l-th target at the t-th frame in operation S3.3.

Based on the above result, the system obtains the horizontal position of the $k_l$-th sigma point of the l-th target at the t-th frame through equation (22):

$$\hat{x}_{l,k_l,t} = \begin{cases} \hat{x}_{i,k_l,t}, & 1 \le l \le N \\ \hat{x}_{j,k_j,t}, & N+1 \le l \le N+M \end{cases} . \tag{22}$$

The system obtains the vertical position of the $k_l$-th sigma point of the l-th target at the t-th frame through equation (23):

$$\hat{y}_{l,k_l,t} = \begin{cases} \hat{y}_{i,k_l,t}, & 1 \le l \le N \\ \hat{x}_{j,k_j,t}, & N+1 \le l \le N+M \end{cases} . \tag{23}$$

In equations (22) and (23), l denotes the index of the target and l=1, . . . , (N+M), and $k_l$ denotes the index of the sigma point sampled from the trajectory state estimate of the l-th target and $k_l$=1,2, . . . , L.

In some embodiments, the set count of the sigma points corresponding to the plurality of sensing targets is different. The process of determining the set count of sigma points of the plurality of sensing targets includes determining the set count of sigma points of the plurality of targets based on the predictive confidence levels of the plurality of targets.

In some embodiments, a set count of sigma points of each target is negatively correlated with a predictive confidence level of the target. The system may determine the set count of sigma points of the plurality of targets based on the above manner. More descriptions regarding the predictive confidence levels may be found hereinabove.

In some embodiments of the present disclosure, the predictive confidence level may reflect the reliability of real-time sensing in the current environment. Therefore, appropriately lowering the set count of sigma points of the plurality of targets under the environmental conditions of a high predictive confidence level may effectively improve recognition efficiency.

In some embodiments, the system may also determine the set count of sigma points of the plurality of targets based on the predictive confidence levels and the motion data of the plurality of targets.

In some embodiments, the system may perform a normalization process on the predictive confidence level and the motion data (e.g., a motion speed) of each target separately and then perform a weighted sum to obtain a first sum value. The first sum value is positively correlated with the set count of sigma points of each target. The greater the first sum value, the greater the set count of sigma points of the target. Weighting coefficients of the weighted sum may be set based on experience.

The system may determine the set count of sigma points of the plurality of targets based on the above manner.

In some embodiments of the present disclosure, the faster the motion speed of a target, the more frequently the target moves. Therefore, determining the set count of sigma points of the target based on the motion speed of the target may ensure the sensing effect of the cooperative vehicles.

In some embodiments, the system may also determine the set count of sigma points of the plurality of targets based on predictive confidence levels and airport operation data.

The airport operation data refers to data used to reflect an operation state of the airport during a preset time period. In some embodiments, the airport operation data includes aircraft movements taking off or landing at the airport and passenger throughput during the preset time period. The preset time period may be set based on experience.

In some embodiments, the system may perform a normalization process on the predictive confidence level of each target, the aircraft movements taking off or landing, and the passenger throughput during the preset time period, respectively, and then perform a weighted sum to obtain a second sum value. The second sum value is positively correlated with the set count of sigma points of each target. The greater the second sum value, the greater the set count of sigma points of the target. Weighting coefficients of the weighted sum may be set based on experience.

The system may determine the set count of sigma points of the plurality of targets based on the above manner.

In some embodiments of the present disclosure, determining the set count of sigma points of the plurality of targets based on the aircraft movements taking off or landing and the passenger throughput, may reduce the wastage of resources and ensure the appropriate matching efficiency while guaranteeing the sensing effect of the cooperative vehicles.

In S4.2, filtering distances and filtering angles of the sigma points of the plurality of cooperative vehicles and the sigma points of the targets are obtained based on positions of sigma points of the plurality of cooperative vehicles and positions of sigma points of the plurality of sensing targets.

In some embodiments, a filtering distance $R_{i,l,k_i,k_l,t}$ and a filtering angle $\hat{A}_{i,l,k_i,k_l,t}$ between the $k_i$-th sigma point of the i-th cooperative vehicle and the $k_l$-th sigma point of the l-th target may be obtained by equations (24) and (25):

$$\hat{R}_{i,l,k_i,k_l,t} = \sqrt{\left(\hat{x}_{i,k_i,t} - \hat{x}_{l,k_l,t}\right)^2 + \left(\hat{y}_{i,k_i,t} - \hat{y}_{l,k_l,t}\right)^2}; \quad (24)$$

$$\hat{A}_{i,l,k_i,k_l,t} = atan2\left(\frac{\hat{y}_{i,k_i,t} - \hat{y}_{l,k_l,t}}{\hat{x}_{i,k_i,t} - \hat{x}_{l,k_l,t}}\right). \quad (25)$$

In equation (25), atan2 (•) denotes an inverse tangent calculation.

In S4.3, a Cramér-Rao lower bound of a pair of the sigma points of the cooperative vehicles and the sigma points of the targets are determined, and a weighted objective function B_(i,l,t) of the targets with respect to the plurality of cooperative vehicles is obtained, where 1 denotes the index of the targets and i denotes the index of the plurality of cooperative vehicles.

In some embodiments, the system may determine a Cramér-Rao lower bound of a pair of the $k_i$-th sigma point of the i-th cooperative vehicle and the $k_l$-th sigma point of the l-th target by equations (26), (27), and (28):

$$CRB_{R,k_i,k_l,t} = c_R \cdot \frac{p_T}{\hat{R}_{i,l,k_i,k_l,t}}; \quad (26)$$

$$CRB_{V,k_i,k_l,t} = c_V \cdot \frac{p_T}{\hat{R}_{i,l,k_i,k_l,t}}; \quad (27)$$

-continued $$CRB_{A,k_i,k_l,t} = c_A \cdot \frac{p_T}{\hat{R}_{i,l,k_i,k_l,t}\cos^2(\hat{A}_{i,l,k_i,k_l,t})}. \quad (28)$$

In equations (26), (27), and (28), $CRB_{R,k_i,k_l,t}$ denotes the Cramér-Rao lower bound of the distance, $CRB_{V,k_i,k_l,t}$ denotes the Cramér-Rao lower bound of the radial speed, $CRB_{A,k_i,k_l,t}$ denotes the Cramér-Rao lower bound of the angle, $c_R$ denotes the distance perception factor defined by the signal waveform, $c_V$ denotes the speed perception factor defined by the signal waveform, $c_A$ denotes the angle perception factor defined by the signal waveform, and $p_T$ denotes the transmit power of a preset array antenna. $c_{(•)}$ denotes a set hyperparameter or a parameter related to system configuration. A radial direction refers to a straight direction from a target to a cooperative vehicle, and the radial speed refers to a projection of speed from the target to the cooperative vehicle.

Furthermore, the system may determine the expectation of the Cramér-Rao lower bound of a L×L sampled sigma points by equations (29), (30), and (31):

$$CRB_{R,t} = \mathbb{E}\left[CRB_{R,k_i,k_l,t}\left(\hat{R}_{i,l,k_i,k_l,t}, \hat{A}_{i,l,k_i,k_l,t}\right)\right]; \quad (29)$$

$$CRB_{V,t} = \mathbb{E}\left[CRB_{V,k_i,k_l,t}\left(\hat{R}_{i,l,k_i,k_l,t}, \hat{A}_{i,l,k_i,k_l,t}\right)\right]; \quad (30)$$

$$CRB_{A,t} = \mathbb{E}\left[CRB_{A,k_i,k_l,t}\left(\hat{R}_{i,l,k_i,k_l,t}, \hat{A}_{i,l,k_i,k_l,t}\right)\right]. \quad (31)$$

In equations (29), (30) and (31), $CRB_{R,t}$ denotes the Cramér-Rao lower bound of the distance, $CRB_{V,t}$ denotes the Cramér-Rao lower bound of the radial speed, $CRB_{A,t}$ denotes the Cramér-Rao lower bound of the angle, $CRB_{V,k_i,k_l,t}$ (•) denotes a function for the Cramér-Rao lower bound of the distance, $CRB_{V,k_i,k_l,t}$ (•) denotes a function for the Cramér-Rao lower bound of the radial speed, $CRB_{A,k_i,k_l,t}$ (•) denotes a function for the Cramér-Rao lower bound of the angle, and E[•] denotes a calculation of a mathematical expectation.

In order to describe a combined perception performance for the distance, the speed, and the angle, the system may set the perceived cost matrix $B_{(N)\times(N+M)}$ as a weighted form of the perceived Cramér-Rao Bound (CRB), and obtain a weighted objective function of the l-th target with respect to the i-th cooperative vehicle by equation (32):

$$B_{i,l,t} = c_1 \cdot CRB_{R,t} + c_2 \cdot CRB_{V,t} + c_3 \cdot CRB_{A,t}. \quad (32)$$

In the equation (32), $B_{i,l,t}$ denotes the weighted objective function of the l-th target with respect to the i-th cooperative vehicle, which is an item of the perceived cost matrix $B_{(N)\times(N+M)}$, $c_1$ denotes a weighted coefficient of a preset distance, $c_2$ denotes a weighted coefficient of a preset radial speed, and $c_3$ denotes a weighted coefficient of a preset angle.

In S4.4, a sensing target matching optimization problem is constructed by using a 0-1 integer programming problem model to achieve sensing of all targets, and optimization variables are defined as a matching matrix $A_{(N)\times(N+M)}$. When a matching item $A_{i,l,t}$=1 in a matching matrix, the cooperative vehicle i forms a beam pointing toward the target l, and the matching item $A_{i,l,t}$=0 represents no beam pointing.

An objective function is established by minimizing a total perceived cost and a constraint is used to ensure that the plurality of targets are perceived by the plurality of cooperative vehicles. The objective function is:

$$\min \sum_{i,j} A_{i,l,t} \cdot B_{i,l,t}$$

$$s.t. \sum_{i} A_{i,l,t} \geq 1$$

$$A_{i,l,t} \in \{0, 1\}$$

The objective function is solved to obtain the targets assigned to the plurality of cooperative vehicles at the current frame moment of the current round.

In some embodiments of the present disclosure, the matching of the cooperative vehicles with the plurality of targets is realized by solving the objective function to obtain the targets assigned to the cooperative vehicles at the current frame moment.

In S5, a channel model of communication and a channel model of sensing are constructed based on geometric relationships in an airport surface networking scenario. Similar to the process of matching the targets to be sensed, the channel model may be estimated based on a posteriori distribution of the trajectory filtering, which introduces a certain uncertainty.

S5 may include the following operations.

In S5.1, position error prediction covariance arrays of the targets are obtained based on the trajectory prediction covariance arrays of the targets.

In some embodiments, the system may obtain a position error prediction covariance array of the target 1 based on the trajectory prediction covariance array of the target obtained in S3 via the equation (33):

$$\hat{P}_{i,l,t} = \hat{P}_{i,t}^{-} + \hat{P}_{l,t}^{-}. \tag{33}$$

$\hat{P}_{i/l/t}$ may be obtained based on the trajectory prediction covariance array $$\hat{P}_{l,t}^{-}$$

of the l-th target at the t-th frame obtained in operation S3.

$$\hat{P}_{i,t}^{-}$$

denotes the trajectory prediction covariance array of the cooperative vehicle i at the t-th frame, and $$\hat{P}_{l,t}^{-}$$

denotes the trajectory prediction covariance array of the target 1 at the t-th frame.

In S5.2, an upper bound of a communication channel uncertainty is obtained.

In some embodiments, the system may obtain the upper bound of the communication channel uncertainty via an equation (34):

$$f_c(\{\hat{P}_{i,l,t}\}) = \sqrt{tr(\Omega_c \hat{P}_{i,l,t})}. \tag{34}$$

In the equation (34), $\Omega_c$, denotes the weighting parameter matrix of the upper bound of the communication channel uncertainty.

In S5.3, an upper bound of a sensing channel uncertainty is obtained.

In some embodiments, the system may obtain the upper bound on the sensing channel uncertainty via an equation (35):

$$f_s(\{\hat{P}_{i,l,t}\}) = \sqrt{tr(\Omega_s \hat{P}_{i,l,t})}. \tag{35}$$

In the equation (35), $\Omega_s$ denotes the weighting parameter matrix of the upper bound of the sensing channel uncertainty.

In S5.4, the channel model of communication and the channel model of sensing are constructed, respectively, to obtain a channel matrix of communication and a channel matrix of sensing.

In some embodiments, the system may construct the channel model of communication and the channel model of sensing via equations (36) and (37), respectively:

$$H_{c,i,l,t} = \bar{H}_{c,i,l,t} + \delta_{H_{c,t}} \|\delta_{H_{c,i,l,t}}\| \leq f_c(\{\hat{P}_{i,l,t}\}); \tag{36}$$

$$H_{s,i,l,t} = \bar{H}_{s,i,l,t} + \delta_{H_{s,t}} \|\delta_{H_{s,i,l,t}}\| \leq f_s(\{\hat{P}_{i,l,t}\}). \tag{37}$$

In the equations (36), (37), $H_{c,i,l,t}$ denotes the channel matrix of communication, $H_{s,i,l,t}$ denotes the channel matrix of sensing, $\bar{H}_{c,i,l,t}$ denotes the mean value of the channel matrix of communication, $\bar{H}_{s,i,l,t}$ denotes the mean value of the channel matrix of sensing, $\delta_{H_{c,t}}$ denotes the error of the channel matrix of communication, and $\delta_{H_{s,t}}$ denotes the error of the channel matrix of sensing.

The channel model of communication is configured to describe a communication link characteristic (e.g., signal fading, interference, etc.) between a cooperative vehicle and a target. In some embodiments, the channel model of communication is configured to optimize the transmission of a communication data stream.

The channel model of sensing is configured to describe a propagation characteristic (e.g., a radar cross section, a Doppler shift, etc.) of a target reflected echo. In some embodiments, the channel model of sensing is configured to enhance sensing accuracy.

In some embodiments of the present disclosure, the performance synergy between communication and sensing is improved by constructing the channel model of communication and the channel model of sensing, to realize a dynamic balance between communication and sensing in resource allocation, beam direction, and power control.

In S6, after completing the matching of the targets to be sensed, for each pair of the cooperative vehicles and the targets obtained by matching, a joint transmit-receive radiation pattern of a MIMO array is designed, and the joint transmit-receive radiation pattern is solved to obtain a transmit precoding matrix of the communication data stream, a transmit precoding matrix of an auxiliary sensing data stream, a communication receive weighting vector, and a value of a sensing receive weighting vector.

The operation S6 is performed by the 5G AeroMACS transceiver array antennas configured on the cooperative vehicles. S6 includes the following operations.

In S6.1, for each pair of the cooperative vehicle i and the target l, the joint transmit-receive radiation pattern of the MIMO array is designed to obtain a transmit signal waveform after the transmit precoding matrix.

In some embodiments, when the communication data stream conforms to an independent Gaussian distribution, the joint transmit-receive radiation pattern and the transmit precoding matrix are directly related to a receive weighting vector, and the system obtains the transmit signal waveform after transmitting precoding via an equation (38):

$$x_{i,l,t} = W_{s,i,l,t} s_{s,i,l,t} + W_{c,i,l,t} s_{c,i,l,t}. \tag{38}$$

In the equation (38), $W_{s,i,l,t}$ denotes the transmit precoding matrix of the auxiliary sensing data stream, $s_{s,i,l,t}$ denotes the auxiliary sensing data stream, $W_{c,i,l,t}$ denotes the transmit precoding matrix of the communication data stream, and $s_{c,i,l,t}$ denotes the communication data stream. The auxiliary sensing data stream $s_{s,i,l,t}$ and the communication data stream $s_{c,i,l,t}$ are preset values.

In addition, the transmit signal waveform satisfies an equation (39):

$$\|x_{i,l,t}\|^2 \leq p_0 \tag{39}.$$

In the equation (39), $p_0$ denotes the maximum total transmit power of the array antenna. The maximum total transmitting power of the array antenna is determined by the settings of the 5G AeroMACS transceiver antenna array configured on the cooperative vehicle.

In S6.2, a signal-to-interference-plus-noise ratio of communication and a signal-to-noise ratio of sensing are constructed, respectively.

In some embodiments, the system may construct the signal-to-interference-plus-noise ratio of communication and the signal-to-noise ratio of sensing via equations (40) and (41), respectively.

$$\gamma_{c,i,l,t} = \frac{\left| w_{r,c,i,l,t}^H H_{c,i,l,t} W_{c,i,l,t} s_{c,i,l,t} \right|^2}{\left| w_{r,c,i,l,t}^H H_{c,i,l,t} W_{s,i,l,t} s_{s,i,l,t} \right|^2 + \left| w_{r,c,i,l,t}^H n_{c,i,l,t} \right|^2}; \tag{40}$$

$$\gamma_{s,i,l,t} = \frac{\left| w_{c,s,i,l,t}^H H_{s,i,l,t} x_{i,l,t} \right|^2}{\left| w_{c,s,i,l,t}^H n_{s,i,l,t} \right|^2}. \tag{41}$$

In equations (40) and (41), $\gamma_{c,i,l,t}$ denotes the signal-to-interference-plus-noise ratio of communication, $\gamma_{s,i,l,t}$ denotes the signal-to-noise ratio of sensing, $$w_{r,c,i,l,t}^H$$

denotes a complex conjugate transpose of the communication receive weighting vector, $$w_{c,s,i,l,t}^H$$

denotes a complex conjugate transpose of the sensing receive weighting vector, $n_{c,i,l,t}$ denotes a communication reception noise, and $n_{s,i,l,t}$ denotes a sensing reception noise.

In S6.3, a joint transmit-receive radiation pattern of communication and sensing is constructed as a following optimization problem in an equation (42):

$$\max \lambda \gamma_{c,i,l,t} + (1 - \lambda) \gamma_{s,i,l,t} \tag{42}$$

$$\text{s.t. } \|x_{i,l,t}\|^2 \leq p_0.$$

In the equation (42), $\lambda$ denotes the weighting factor and $0 \leq \lambda \leq 1$.

In S6.4, the optimization problem is solved to obtain the transmit precoding matrix of the communication data stream, the transmit precoding matrix of the auxiliary sensing data stream, the communication receive weighting vector, and the value of the sensing receive weighting vector.

In some embodiments, the optimization variables in the optimization problem include a transmit precoding matrix $W_{c,i,l,t}$ of the communication data stream and a transmit precoding matrix $W_{s,i,l,t}$ of the auxiliary sensing data stream. The channel uncertainty makes the problem to be an uncertainty optimization problem, where robust optimization is performed based on the upper bound of the uncertainty, and a genetic algorithm is used for iterative solution to obtain the transmit precoding matrix of the communication data stream, the transmit precoding matrix of the auxiliary sensing data stream, the communication receive weighting vector, and the value of the sensing receive weighting vector. The iterative solution based on the genetic algorithm may include firstly, constructing an initialized population with all unknown variables, the objective function being used as the fitness function, and realizing a growth and convergence of the fitness function by using iterative operations such as selection, crossover, and variation to obtain the solution of the transmit precoding matrix $W_{c,i,l,t}$ of the communication data stream and the transmit precoding matrix $W_{s,i,l,t}$ of the auxiliary sensing data stream in the above optimization problem.

In S7, signal transmitting and receiving beamforming of the cooperative vehicles are realized to realize real-time monitoring of the targets on the airport surface by means of the transmit precoding matrix of the communication data stream, the transmit precoding matrix of the auxiliary sensing data stream, the communication receive weighting vector, and the value of the sensing receive weighting vector.

In some embodiments, the real-time monitoring includes generating, based on real-time monitoring results of the targets, a dispatch instruction to control the cooperative vehicles to drive away from an alert region; and/or generating an alert instruction to control broadcasting devices in the alert region where the targets are present to broadcast a pre-existing voice for evacuation.

The real-time monitoring results of the targets refer to results of real-time monitoring of a plurality of cooperative vehicles at the airport surface. For example, the real-time monitoring results of the targets may include locations, distribution, etc., of the cooperative vehicles. In some embodiments, the system may monitor a plurality of cooperative vehicles at the airport surface in real time to obtain the real-time monitoring results of the targets.

The dispatch instruction is configured to schedule the cooperative vehicle to drive away from the alert region. For example, the dispatch instruction may include the dispatched cooperative vehicle. In some embodiments, the system may determine, based on the real-time monitoring results of the target, whether the cooperative vehicles exist in the alert region. In response to determining that the cooperative vehicles exist in the alert region, the system may determine the cooperative vehicles as the dispatched cooperative vehicles, and automatically generate a dispatch instruction through a first preset program. The first preset program may be set by a technician in advance.

The alert region refers to a region with a potential risk. In some embodiments, the alert region includes a plurality of runways where aircraft are to take off or land.

In some embodiments, the system may control the cooperative vehicles in the alert region to drive away from the alert region in a plurality of manners based on the dispatch instruction. For example, when the cooperative vehicles are equipped with autopilot systems, the system may be communicatively connected with the autopilot systems to control the cooperative vehicles to drive away from the alert region. As another example, when the cooperative vehicles are not equipped with autopilot systems or the system is unable to communicate and connect with the autopilot systems, the system may send the locations of the cooperative vehicles to a dispatch terminal (e.g., a smart device such as a cellular phone) to enable a dispatcher to go to the locations and control the cooperative vehicles to drive away from the alert region.

The alert instruction is configured to alert the cooperative vehicles to drive away from the alert region. For example, the alert instruction may include vehicle identifications (e.g., license plate numbers, etc.) corresponding to the cooperative vehicles in the alert region. In some embodiments, the system may obtain the vehicle identifications (e.g., license plate numbers, etc.) of the cooperative vehicles in the alert region based on a camera device at the airport and automatically generate the alert instruction through a second preset program. The second preset program may be set by a technician in advance.

In some embodiments, the system may determine, based on the alert instruction and the locations of the cooperative vehicles in the alert region, the broadcasting devices that are at distances of less than a distance threshold from the cooperative vehicles, and control the broadcasting devices to broadcast the vehicle identifications corresponding to the cooperative vehicles and the pre-existing voice for evacuation. The distance threshold may be set based on experience.

In some embodiments, the system may generate only the dispatch instruction or the alert instruction, or both the dispatch instruction and the alert instruction based on the real-time monitoring results of the targets.

In some embodiments of the present disclosure, generating the dispatch instruction or the alert instruction based on the real-time monitoring results of the targets and controlling or alerting the cooperative vehicles to drive away from the alert region, may avoid an accident with the cooperative vehicle during the aircraft taking off or landing.

In some embodiments, the system may return to the operation S2 to execute a next round of sensing matching based on an instruction, which includes generating beamforming parameters based on the transmit precoding matrix of the communication data stream, the transmit precoding matrix of the auxiliary sensing data stream, the communication receive weighting vector, and the value of the sensing receive weighting vector, and driving, based on the beamforming parameters, the transceiver array antenna of the cooperative vehicle to operate via a controller. The instruction herein may be set as in response to receiving a stop command, terminating the all program; in response to not receiving the stop command, automatically returning to the operation S2 to perform the next round of sensing matching, and obtaining a measurement result $\tilde{z}_{l,t}$ obtained based on the reflected echoes of the targets obtained based on the signal transmitting and receiving beamforming of the cooperative vehicles, and providing the measurement result $\tilde{z}_{l,t}$ to the next round of the operation S3.

The beamforming parameters refer to parameters used to adjust the performance of each antenna in the transceiver array antennas to achieve beam formation and signal enhancement in a particular direction. For example, the beamforming parameters may include amplitudes and phase differences of the transmitted/received signals of the transceiver array antennas.

In some embodiments, the system may extract the amplitudes and phases of the transmitted/received signals of the antenna directly from the precoding matrix and the weighting vector, determine the phase differences of the transmitted/received signals, and use the amplitudes and phase differences of the transmitted/received signals as the beamforming parameters.

The controller refers to a device used to manage and control the operation of other devices or systems. In some embodiments, a controller may be installed on a cooperative vehicle (e.g., an on-board system on the cooperative vehicle), and a controller may integrate one of a microcontroller unit (MCU), a digital signal processor (DSP), a field-programmable gate array (FPGA), or an application-specific integrated circuit (ASIC) chip, etc. The controller may be communicatively connected to the system.

In some embodiments, the system may drive the transceiver array antennas of a plurality of cooperative vehicles to operate via a plurality of controllers based on the beamforming parameters.

In some embodiments of the present disclosure, generating the beamforming parameters and controlling the transceiver array antennas based on the generated beamforming parameters, may realize beamforming, to control the directions of the beams.

In some embodiments, for all 5G AeroMACS mobile base stations, the system may follow the designed transmit precoding matrix $W_{c,i,l,t}$ for the communication sensing signal transmission to realize sensing of all targets on the airport surface while the communication function is being performed. The cooperative vehicles receive the reflected echoes of the targets and obtain the measurement result $\tilde{z}_{l,t}$. The system provides the measurement result $\tilde{z}_{l,t}$ in the next time loop to the operation S3 to realize the spatio-temporal evolution of the trajectory to the sensing targets, realize the sensing targets matching based on the operation S4, establish and the channel model of communication and sensing based on the operation S5, and finally realize the waveform design in the next time loop based on the operation S6.

Some embodiments of the present disclosure further provide a system for performing the method for scheduling integrated sensing and communication beams for the multi-base station 5G AeroMACS. The system includes the cooperative vehicles configured in the airport surface, where each of the cooperative vehicles being configured with the 5G AeroMACS transceiver array antenna (referred to as the array antenna), the satellite positioning system, and the speed sensing system, the satellite positioning system being configured to obtain absolute position information of the cooperative vehicles, and the speed sensing system including a speedometer integrated in a control system of the cooperative vehicles; and sensing targets, including non-cooperative vehicles and aircraft at the airport surface, the cooperative vehicles and the sensing targets forming the 5G AeroMACS integrated sensing and communication network for the airport surface, and each of the cooperative vehicles being configured with a measure module, a trajectory evolution module, and a target matching module of an approximate posterior distribution.

In some embodiments, the measure module, the trajectory evolution module, and the target matching module are also configured on each of the cooperative vehicles. The measure module includes the active sensing model, the satellite positioning model, and the self speed model of each of the cooperative vehicles, and may obtain the state measured values of each of the cooperative vehicle and each of the sensing targets at the current moment based on information provided by the satellite positioning system and the speed sensing system. The trajectory evolution module includes the Kalman prediction model, the trajectory filtering model, and the trajectory prediction model. The trajectory evolution module may obtain the trajectory filtering results and the trajectory prediction results at the next moment based on the state measured values of each of the cooperative vehicles and each of the sensing targets obtained at the current moment. The target matching module matches the sensing targets and the cooperative vehicles based on the state measured values of the cooperative vehicles and the sensing targets at the current moment and the trajectory filtering results and the trajectory prediction results at the next moment and assigns sensing targets to the cooperative vehicles at the current moment and ensures that each sensing target is sensed. The array antennas configured on the plurality of cooperative vehicles perform the integrated sensing and communication beams forming based on the matching results of the target matching module, to realize real-time monitoring of the sensing targets at the airport surface.

Figure 6A:
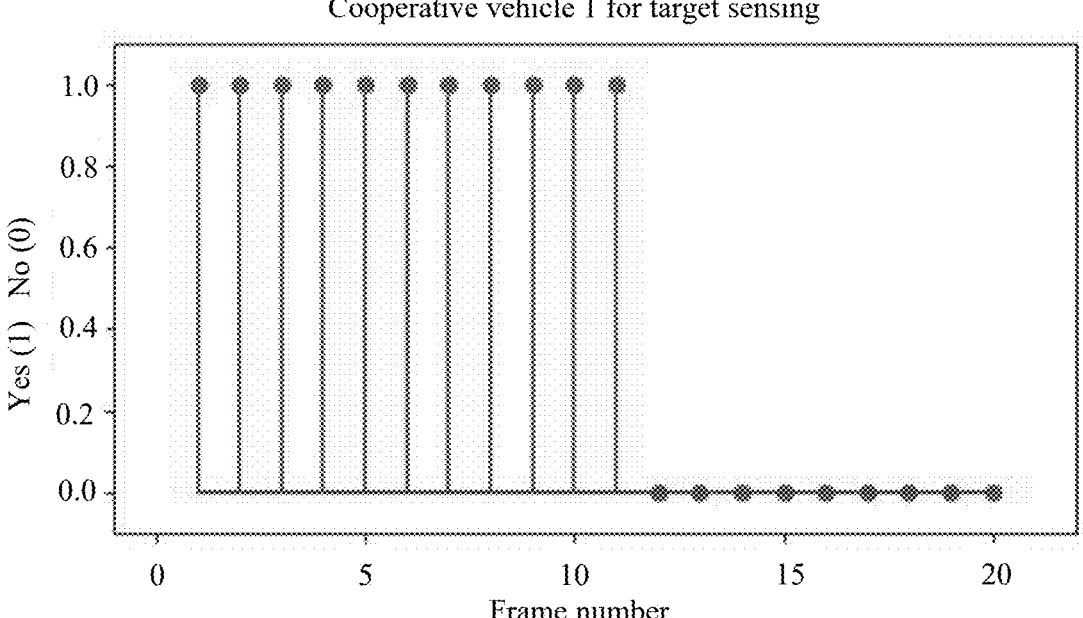
FIG. 6a is a schematic diagram illustrating a result of matching sensing targets obtained by applying a method for scheduling integrated sensing and communication beams for a multi-base station 5G AeroMACS according to some embodiments of the present disclosure.
Figure 6B:
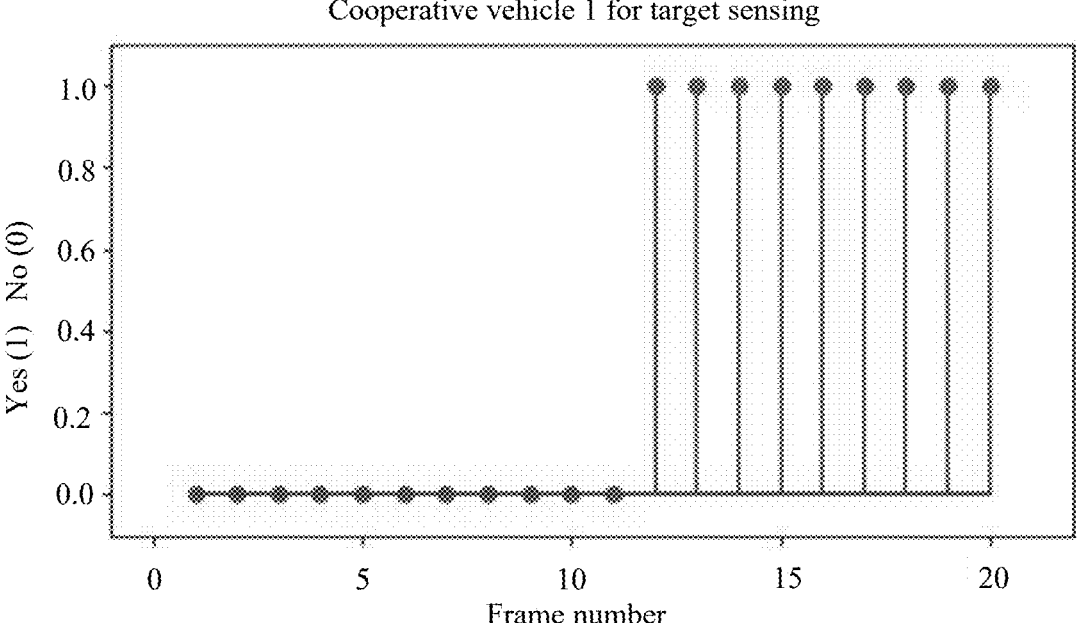
FIG. 6b is a schematic diagram illustrating another result of matching sensing targets obtained by applying a method for scheduling integrated sensing and communication beams for a multi-base station 5G AeroMACS according to some embodiments of the present disclosure.
Figure 7:
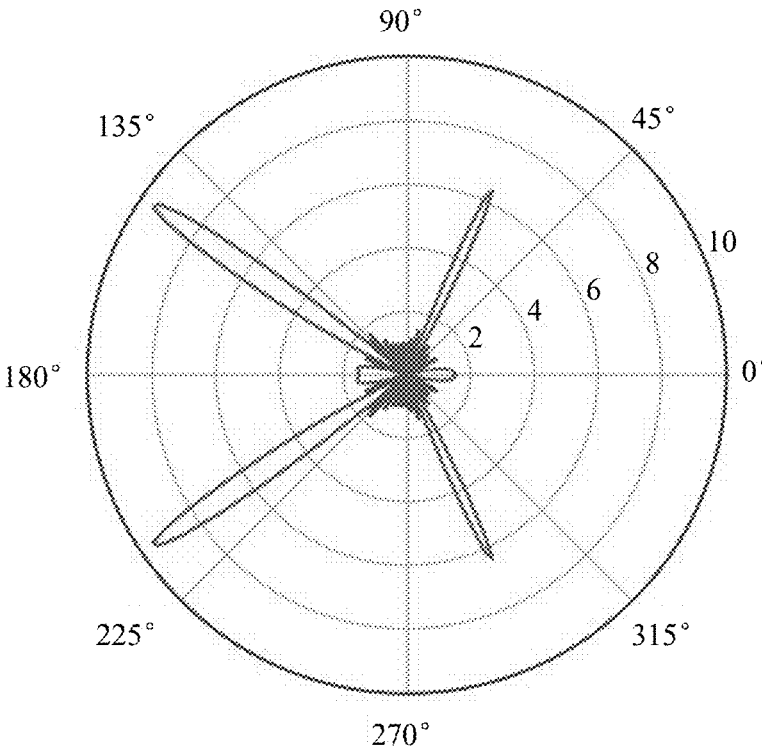
FIG. 7 is a schematic diagram illustrating a beam direction of a cooperative vehicle 1 obtained by applying a method for scheduling integrated sensing and communication beams for a multi-base station 5G AeroMACS according to some embodiments of the present disclosure.
Figure 8:
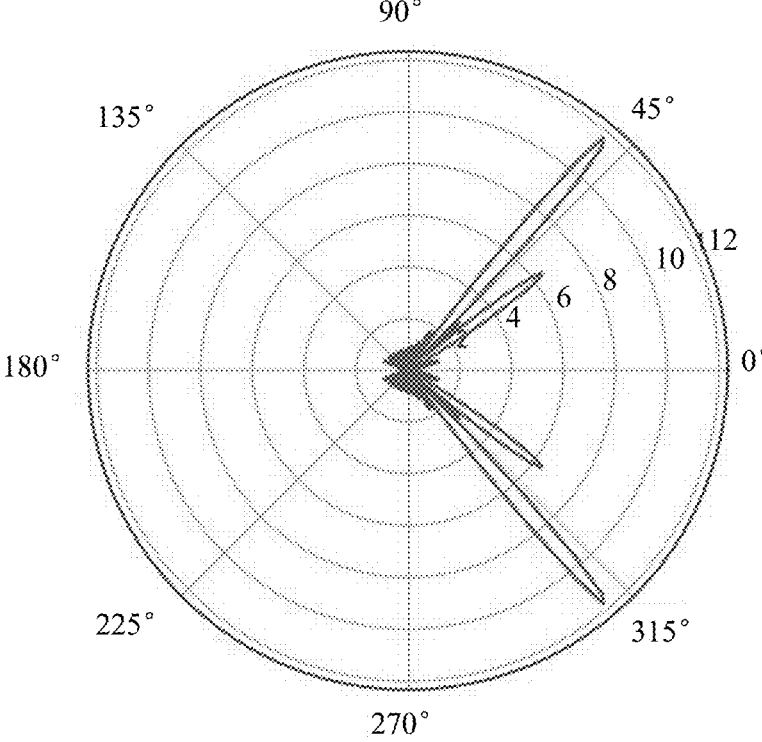
FIG. 8 is a schematic diagram illustrating a beam direction diagram of a cooperative vehicle 2 obtained by applying a method for scheduling integrated sensing and communication beams for a multi-base station 5G AeroMACS according to some embodiments of the present disclosure.

FIG. 6a is a schematic diagram illustrating a result of matching sensing targets obtained by applying a method for scheduling integrated sensing and communication beams for a multi-base station 5G AeroMACS according to some embodiments of the present disclosure. FIG. 6b is a schematic diagram illustrating another result of matching sensing targets obtained by applying a method for scheduling integrated sensing and communication beams for a multi-base station 5G AeroMACS according to some embodiments of the present disclosure. FIG. 7 is a schematic diagram illustrating a beam direction of a cooperative vehicle 1 obtained by applying a method for scheduling integrated sensing and communication beams for a multi-base station 5G AeroMACS according to some embodiments of the present disclosure. FIG. 8 is a schematic diagram illustrating a beam direction diagram of a cooperative vehicle 2 obtained by applying a method for scheduling integrated sensing and communication beams for a multi-base station 5G AeroMACS according to some embodiments of the present disclosure.

Embodiment 1

Exemplary embodiments of applying the method for scheduling integrated sensing and communication beams for a multi-base station 5G AeroMACS provided in some embodiments of the present disclosure are illustrated below with reference to FIGS. 4-8.

In embodiment 1, two cooperative vehicles are set to operate simultaneously at the airport surface, operation directions along the horizontal direction and vertical direction (i.e., x-direction and y-direction in FIGS. 4-5), with a speed of 20 m/s, respectively. A sensing target in the airport surface is fixed, the frame interval is set to be 1 s, and the scene is set as shown in FIG. 4. Each cooperative vehicle is equipped with a transceiver array with 16 antennas for scheduling integrated sensing and communication beams in the embodiment.

At a plurality of moments, the two cooperative vehicles integrate the satellite positioning and speed sensing information based on the sensing echoes and execute the trajectory spatio-temporal evolution based on the process of S2 and S3 in the method for scheduling integrated sensing and communication beams for the multi-base station 5G Aero-MACS provided by some embodiments of the present disclosure, and the result is shown in FIG. 5. The covariance matrix of the process noise is a diagonal matrix with element 1, the covariance matrix of the measured noise is a diagonal matrix with element 1, and the covariance matrix of the cooperative vehicles is a diagonal matrix with element 1.

The target matching module matches the cooperative vehicles with the sensing targets based on operation S4 in the method for scheduling integrated sensing and communication beams for the multi-base station 5G AeroMACS provided by some embodiments of the present disclosure, and the results of the matching are shown as FIG. 6a and FIG. 6b, with the first 11 moments being target sensed by a cooperative vehicle 1 and the last 9 moments being target sensed by a cooperative vehicle 2. The weighting factor of distance, the weighting factor of radial speed, the weighting factor of angle, the distance perception factor, the speed perception factor, and the angle perception factor used are all 1.

Joint transmit-receive radiation patterns are designed in the cooperative vehicles based on operations S5 and S6 in the method for scheduling integrated sensing and communication beams for the multi-base station 5G AeroMACS provided in some embodiments of the present disclosure. The beam direction diagrams of cooperative vehicle 1 and cooperative vehicle 2 at the 5th moment and 15th moment are given in FIG. 7 and FIG. 8, respectively, and it may be seen that the cooperative vehicles realize a beam towards the sensing target and a communication beam towards the cooperative vehicles based on results of the sensing target matching.

The method for scheduling integrated sensing and communication beams for the multi-base station 5G AeroMACS and the system for performing the method provided by some embodiments of the present disclosure not only enhance the monitoring capability of the airport surface but also provide more reliable safety management of a civil aviation field technology support, providing a more efficient and intelligent way of monitoring and managing airport surfaces and providing a solid guarantee for the operational safety and efficiency of the airport.

The system for performing the method for scheduling integrated sensing and communication beams for the multi-base station 5G AeroMACS provided by some embodiments of the present disclosure provides a comprehensive and highly efficient monitoring of the airport surface by integrating advanced waveform design and signal processing technologies, which fully considers the complexity and dynamics of airport surface and significantly improves the accuracy and reliability of monitoring through optimized signal transmission and processing strategies.

In the method for scheduling integrated sensing and communication beams for the multi-base station 5G Aero-MACS and the system for performing the method provided by some embodiments of the present disclosure, through a multi-base station architecture, each of the base stations may transmit and receive integrated sensing and communication waveforms, and through accurate signal processing, target localization, identification, and tracking are achieved. The multi-base station design not only improves the coverage of the system but also enhances the ability to adapt to complex environments and dynamic changes. The system may monitor the plurality of cooperative vehicles and sensing targets at the airport surface in real-time, ensuring the accuracy and real-time availability of monitoring data. The scheduling algorithm framework of the integrated sensing and communication beams integrates the parallel acquisition of quantitative measurements such as the positions and speeds of the cooperative vehicles and sensing targets by multiple base stations and obtains information such as the relative distances, the relative speeds, relative angles, etc., between the antenna arrays and the detection targets. The cooperative vehicles are configured with on-board satellite positioning systems and speed sensing systems, which provide the absolute position and speed information of the cooperative vehicles, further enhancing the sensing capability of the system. Through the integration of the systems, it is possible to realize comprehensive monitoring of cooperative vehicles and sensing targets, providing more comprehensive data support.

The system for performing the method for scheduling integrated sensing and communication beams for the multi-base station 5G AeroMACS provided in some embodiments of the present disclosure further includes the perceived cost matrix for describing the combined perception performance for distance, speed, and angle. With the perceived cost matrix, sensing target matching may be performed more efficiently to ensure that each sensing target may be sensed by the cooperative vehicles. The system uses the 0-1 integer programming problem model to solve the sensing target matching optimization problem, and solves the sensing target matching optimization problem by a planning manner. Finally, the optimization of the joint transmit-receive radiation pattern is achieved under resource constraints.

All of the above optional technical solutions may be used in any combination to form optional embodiments of the present disclosure, which will not be repeated herein.

It should be understood that the magnitude of the serial numbers of the steps in the above-described embodiments does not imply the order of execution, and the order of execution of the processes should be determined by their functions and inherent logic without constituting any limitation of the process of implementation of the embodiments of the present disclosure.

The foregoing is only a better specific embodiment of the present disclosure, but the scope of protection of the present disclosure is not limited thereto. Any variation or substitution readily conceivable by any person skilled in the art within the scope of the technology disclosed herein shall be covered by the scope of protection of the present disclosure.

What is claimed is:

1. A method for scheduling integrated sensing and communication beams for a multi-base station 5G aeronautical mobile airport communications system (AeroMACS), comprising:

providing cooperative vehicles at an airport surface, equipping each of the cooperative vehicles with a 5G AeroMACS transceiver array antenna, a satellite positioning system, and a speed sensing system, and using non-cooperative vehicles as sensing targets;

establishing a 5G AeroMACS integrated sensing and communication network for the airport surface based on the cooperative vehicles and the sensing targets, wherein a plurality of targets include the cooperative vehicles and the sensing targets, and the establishing a 5G AeroMACS integrated sensing and communication network for the airport surface includes:

setting a count of the cooperative vehicles to be N, a count of the sensing targets to be M wherein a true state vector of the plurality of targets at a moment of a current frame t of a current round is:

$$\bar{v}_{l,t}=[\bar{x}_{l,t},\bar{y}_{l,t},\bar{v}_{x,l,t},\bar{v}_{y,l,t}]^{T}, l=1,2,\ldots N \ldots N+M$$

l denotes an index of one target of the plurality of targets, $\bar{x}_{l,t}$ denotes a horizontal position of a target l, $\bar{y}_{l,t}$ denotes an vertical position of the target, $\bar{v}_{x,l,t}$ denotes a horizontal speed of the target l, $\bar{v}_{y,l,t}$ denotes a vertical speed of the target l, $(\bar{x}_{l,t}, \bar{y}_{l,t})$ is designated as a true position of the target l, and $(\bar{v}_{x,l,t}, \bar{v}_{y,l,t})$ is designated as a true speed of the target l;

establishing a measurement model, including establishing an active sensing model, a satellite positioning model of the cooperative vehicles, and a self speed model of the cooperative vehicles, performing measurements, and obtaining a measurement set at a current frame moment;

constructing a trajectory evolution model based on a Kalman filtering algorithm to portray motion states of the cooperative vehicles and the sensing targets in a real coordinate system;

matching the cooperative vehicles with the plurality of targets to obtain targets assigned to a plurality of cooperative vehicles at the current frame moment;

constructing a channel model of communication and a channel model of sensing based on geometric relationships in an airport surface networking scenario;

for each pair of the cooperative vehicles and the targets obtained by matching, designing a joint transmit-receive radiation pattern of a multiple-input multiple-output (MIMO) array and solving the joint transmit-receive radiation pattern to obtain a transmit precoding matrix of a communication data stream, a transmit precoding matrix of an auxiliary sensing data stream, a communication receive weighting vector, and a value of a sensing receive weighting vector;

realizing signal transmitting and receiving beamforming of the cooperative vehicles to realize real-time monitoring of the plurality of targets on the airport surface by means of the transmit precoding matrix of the communication data stream, the transmit precoding matrix of the auxiliary sensing data stream, the communication receive weighting vector, and the value of the sensing receive weighting vector; and confirming whether a stop command is received, in response to determining that the stop command is received, terminating a program; in response to determining that the stop command is not received, re-establishing the measurement model for measurement and obtaining the measurement set at the current frame moment, and receiving reflected echoes of the plurality of targets based on the signal transmitting and receiving beamforming of the cooperative vehicles, obtaining a measurement result, and substituting the measurement result to execute a next round of sensing matching, including:

generating beamforming parameters based on the transmit precoding matrix of the communication data stream, the transmit precoding matrix of the auxiliary sensing data stream, the communication receive weighting vector, and the value of the sensing receive weighting vector, and driving, based on the beamforming parameters, the transceiver array antenna of the cooperative vehicle to operate via a controller.

2. The method of claim 1, wherein the real-time monitoring includes:

generating, based on real-time monitoring results of the plurality of targets, a dispatch instruction to control the cooperative vehicles to drive away from an alert region; and/or generating an alert instruction to control broadcasting devices in the alert region where the plurality of targets are present to broadcast a pre-existing voice for evacuation, wherein the alert region includes a plurality of runways where aircraft are to take off or land.

3. The method of claim 1, wherein the satellite positioning system is configured to obtain absolute position information of the cooperative vehicles, and the speed sensing system includes a speedometer integrated in a control system of the cooperative vehicles.

4. The method of claim 1, wherein the establishing a measurement model, including establishing an active sensing model, a satellite positioning model of the cooperative vehicles, and a self speed model of the cooperative vehicles, performing measurements, and obtaining a measurement set at a current frame moment, includes:

constructing the active sensing model;

constructing the satellite positioning model of the cooperative vehicles based on the satellite positioning system configured on the cooperative vehicles;

constructing the self speed model of the cooperative vehicles based on the speed sensing system configured on the cooperative vehicles;

performing corresponding signal processing and target parameter estimation based on target reflected echoes of sensing beams emitted in a previous iteration to obtain measured values of positions and measured values of speeds of the sensing targets at the current frame moment of the current round, wherein for a first iteration, the measured values of positions and the measured values of speeds of the sensing targets are measured values of preset positions and measured values of speeds of the sensing targets;

obtaining the measurement result through the active sensing model, the satellite positioning model of the cooperative vehicles, and the self speed model of the cooperative vehicles, and obtaining the measurement set at the current frame moment, wherein the measurement set includes the current frame moment, measured values of relative distances between the cooperative vehicles and the plurality of targets, measured values of relative speeds between the cooperative vehicles and the plurality of targets, measured values of relative angles between the cooperative vehicles and the plurality of targets, and measurement results of the plurality of targets; the measurement results of the plurality of targets are measured values of positions and measured values of speeds of the plurality of targets, including measured values of positions and measured values of speeds of the cooperative vehicles, and measured values of positions and measured values of speeds of the sensing targets.

5. The method of claim 4, wherein the trajectory evolution model includes: a Kalman prediction model, a trajectory filtering model, and a trajectory prediction model.

6. The method of claim 5, wherein the constructing a trajectory evolution model based on a Kalman filtering algorithm to portray motion states of the cooperative vehicles and the sensing targets in a real coordinate system includes:

for all targets, constructing the Kalman prediction model based on trajectory state predictions and trajectory prediction covariance arrays of the plurality of targets of previous two rounds and obtaining trajectory state one-step predictions and trajectory one-step prediction covariance arrays of the plurality of targets;

constructing the trajectory filtering model based on a measurement correlation result of a minimum Mahalanobis distance through a trajectory updating process, and obtaining trajectory state estimates of the plurality of targets and trajectory filtering covariance arrays;

constructing the trajectory prediction model based on the trajectory state estimates of the plurality of targets and the trajectory filtering covariance arrays and obtaining the trajectory state predictions and the trajectory prediction covariance arrays of the plurality of targets for the current round; and judging a detection of the all targets, comparing a count of consecutive undetected frames of the plurality of targets with a preset exit frame threshold, and determining a target for which the count of consecutive undetected frames is greater than or equal to the preset exit frame threshold as a target extinction, wherein the target exits a trajectory filtering loop; and for a target for which the count of consecutive undetected frames is less than the preset exit frame threshold, saving the trajectory state predictions and the trajectory prediction covariance arrays obtained for the current round as a trajectory filtering result and a trajectory prediction result of the target.

7. The method of claim 6, wherein the comparing a count of consecutive undetected frames of the plurality of targets with a preset exit frame threshold includes:

comparing the count of consecutive undetected frames of the plurality of targets with a plurality of preset exit frame thresholds corresponding to the plurality of targets, wherein the plurality of preset exit frame thresholds corresponding to the plurality of targets are determined at a first time point corresponding to the plurality of targets, the first time point corresponding to the plurality of targets refers to a time point nearest to a current time point at which the plurality of targets are detected; and determining the plurality of preset exit frame thresholds corresponding to the plurality of targets includes:

determining predictive confidence levels of the plurality of targets based on positions of the plurality of targets and an environmental complexity value of an airport, wherein the environmental complexity value is determined based on an environmental characteristic; and determining the plurality of preset exit frame thresholds corresponding to the plurality of targets based on the predictive confidence levels of the plurality of targets, motion data of the plurality of targets, and the environmental characteristics.

8. The method of claim 7, wherein the determining the plurality of preset exit frame thresholds corresponding to the plurality of targets based on the predictive confidence levels of the plurality of targets, motion data of the plurality of targets, and the environmental characteristics further includes:

determining, based on the predictive confidence levels, the motion data, the environmental characteristics, and perceptual importance values of the plurality of targets, the plurality of preset exit frame thresholds corresponding to the plurality of targets, wherein the perceptual importance values of the plurality of targets are related to the positions of the plurality of targets.

9. The method of claim 6, wherein the matching the cooperative vehicles with a plurality of targets to obtain targets assigned to a plurality of cooperative vehicles at the current frame moment includes:

sampling, based on the trajectory state predictions and the trajectory prediction covariance arrays of the plurality of targets, trajectory state estimates of a plurality of the cooperative vehicles and a plurality of sensing targets, respectively, sampling a set count of sigma points, and obtaining state vectors and positions of a plurality of sampled sigma points;

obtaining, based on positions of sigma points of the plurality of cooperative vehicles and positions of sigma points of the plurality of sensing targets, filtering distances and filtering angles of the sigma points of the plurality of cooperative vehicles and the sigma points of the plurality of targets;

determining a Cramér-Rao lower bound of a pair of the sigma points of the cooperative vehicles and the sigma points of the plurality of targets, and obtaining a weighted objective function $B_{i,l,t}$ of the plurality of targets with respect to the plurality of cooperative vehicles, wherein i denotes an index of the plurality of cooperative vehicles;

constructing a sensing target matching optimization problem by using a 0-1 integer programming problem model to achieve sensing of the all targets, and defining optimization variables as a matching matrix, wherein when a matching item $A_{i,l,t}=1$ in a matching matrix, a cooperative vehicle i forms a beam pointing toward a target l, and the matching item $A_{i,l,t}=0$ represents no beam pointing;

establishing an objective function, by minimizing a total perceived cost and using a constraint to ensure that the plurality of targets are perceived by the plurality of cooperative vehicles, wherein the objective function is:

$$\min \sum_{i,l} A_{i,l,t} \cdot B_{i,l,t}$$

$$\text{s.t. } \sum_{i} A_{i,l,t} \geq 1; \text{ and}$$

$$A_{i,l,t} \in \{0, 1\}$$

solving the objective function to obtain the targets assigned to the plurality of cooperative vehicles at the current frame moment of the current round.

10. The method of claim 9, wherein the set count of sigma points corresponding to the plurality of sensing targets is different; and determining the set count of sigma points of the plurality of sensing targets includes:

determining the set count of sigma points of the plurality of targets based on predictive confidence levels of the plurality of targets.

11. The method of claim 10, wherein the determining the set count of sigma points of the plurality of targets based on predictive confidence levels of the plurality of targets further includes:

determining the set count of sigma points of the plurality of targets based on the predictive confidence levels and motion data of the plurality of targets.

12. The method of claim 10, wherein the determining the set count of sigma points of the plurality of targets based on predictive confidence levels of the plurality of targets further includes:

determining the set count of sigma points of the plurality of targets based on the predictive confidence levels and airport operation data, wherein the airport operation data includes aircraft movements taking off or landing at the airport and passenger throughput during a preset time period.

13. The method of claim 9, wherein the constructing a channel model of communication and a channel model of sensing based on geometric relationships in an airport surface networking scenario includes:

obtaining position error prediction covariance arrays of the plurality of targets based on the trajectory prediction covariance arrays of the plurality of targets;

obtaining an upper bound of a communication channel uncertainty;

obtaining an upper bound of a sensing channel uncertainty; and constructing the channel model of communication and the channel model of sensing, respectively, to obtain a channel matrix of communication and a channel matrix of sensing.

14. The method of claim 13, wherein the for each pair of the cooperative vehicles and the plurality of targets obtained by matching, designing a joint transmit-receive radiation pattern of a multiple-input multiple-output (MIMO) array and solving the joint transmit-receive radiation pattern to obtain a transmit precoding matrix of a communication data stream, a transmit precoding matrix of an auxiliary sensing data stream, a communication receive weighting vector, and a value of a sensing receive weighting vector includes:

for each pair of a cooperative vehicle i and a target l, designing the joint transmit-receive radiation pattern of the MIMO array, and obtaining a transmit signal waveform after the transmit precoding matrix as:

$$x_{i,l,t} = W_{s,i,l,t} s_{s,i,l,t} + W_{c,i,l,t} s_{c,i,l,t},$$

wherein $W_{s,i,l,t}$ denotes the transmit precoding matrix of the auxiliary sensing data stream, $s_{s,i,l,t}$ denotes the auxiliary sensing data stream, $W_{c,i,l,t}$ denotes the transmit precoding matrix of the communication data stream, and $s_{c,i,l,t}$ denotes the communication data stream, and the auxiliary sensing data stream $s_{s,i,l,t}$ and the communication data stream $s_{s,i,l,t}$ are preset values; and the transmit signal waveform satisfies:

$$\|x_{i,l,t}\|^2 \leq p_0,$$

$p_0$ denotes a maximum total transmit power of array antennas, the maximum total transmit power of the array antennas is determined by setting the 5G AeroMACS transceiver array antenna assembled in the cooperative vehicles;

constructing a signal-to-interference-plus-noise ratio of communication and a signal-to-noise ratio of sensing, respectively:

$$\gamma_{c,i,l,t} = \frac{\left| w_{r,c,i,l,t}^{H} H_{c,i,l,t} W_{c,i,l,t} s_{c,i,l,t} \right|^{2}}{\left| w_{r,c,i,l,t}^{H} H_{c,i,l,t} W_{s,i,l,t} s_{s,i,l,t} \right|^{2} + \left| w_{r,c,i,l,t}^{H} n_{c,i,l,t} \right|^{2}}$$

$$\gamma_{s,i,l,t} = \frac{\left| w_{c,s,i,l,t}^{H} H_{s,i,l,t} x_{i,l,t} \right|^{2}}{\left| w_{c,s,i,l,t}^{H} n_{s,i,l,t} \right|^{2}},$$

wherein $\gamma_{c,i,l,t}$ denotes the signal-to-interference-plus-noise ratio of communication, $\gamma_{s,i,l,t}$ denotes the signal-to-noise ratio of sensing, $$w_{r,c,i,l,t}^{H}$$

denotes a complex conjugate transpose of the communication receive weighting vector, $$w_{c,s,i,l,t}^{H}$$

denotes a complex conjugate transpose of the sensing receive weighting vector, $n_{c,i,l,t}$ denotes a communication reception noise, $n_{s,i,l,t}$ denotes a sensing reception noise, $H_{c,i,l,t}$ denotes the channel matrix of communication, and $H_{s,i,l,t}$ denotes the channel matrix of sensing;

constructing a joint transmit-receive radiation pattern of communication and sensing as a following optimization problem:

$$\max \lambda \gamma_{c,i,l,t} + (1 - \lambda) \gamma_{s,i,l,t}$$

$$\text{s.t.} \| x_{i,l,t} \|^{2} \leq p_{0},$$

wherein $\lambda$ denotes a weighting factor and $0 \leq \lambda \leq 1$; and solving the optimization problem to obtain the transmit precoding matrix of the communication data stream, the transmit precoding matrix of the auxiliary sensing data stream, the communication receive weighting vector, and the value of the sensing receive weighting vector.

*   *   *   *   *